US006986043B2

(12) United States Patent
Andrew et al.

(10) Patent No.: US 6,986,043 B2
(45) Date of Patent: *Jan. 10, 2006

(54) ENCRYPTING FILE SYSTEM AND METHOD

(75) Inventors: Brian Andrew, Redmond, WA (US); Jianrong Gu, Bellevue, WA (US); Mark J. Zbikowski, Woodinville, WA (US); Praerit Garg, Kirkland, WA (US); Mike K. Lai, Bellevue, WA (US); Wesley Witt, Redmond, WA (US); Klaus U. Schutz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

This patent is subject to a terminal disclaimer.

(21) Appl. No.: 09/870,411

(22) Filed: May 29, 2001

(65) Prior Publication Data
US 2002/0019935 A1 Feb. 14, 2002

Related U.S. Application Data

(63) Continuation-in-part of application No. 08/931,774, filed on Sep. 16, 1997, now Pat. No. 6,249,886.

(51) Int. Cl.
H04L 9/00 (2006.01)
(52) U.S. Cl. ...................... 713/166; 380/286
(58) Field of Classification Search ................ 713/165, 713/166, 167
See application file for complete search history.

(56) References Cited

U.S. PATENT DOCUMENTS

| 4,386,234 A | 5/1983 | Ehrsam et al. |
| 5,224,166 A | 6/1993 | Hartman, Jr. |
| 5,319,705 A | 6/1994 | Halter et al. |
| 5,598,470 A | 1/1997 | Cooper et al. |
| 5,870,468 A | 2/1999 | Harrison |
| 5,870,477 A | 2/1999 | Sasaki et al. |
| 6,185,681 B1 * | 2/2001 | Zizzi ........................ 713/165 |

(Continued)

FOREIGN PATENT DOCUMENTS

EP 0 681 233 A1 11/1995

OTHER PUBLICATIONS

"Microsoft Kernel Mode Cryptographic Module", Microsoft TechNet document, Oct. 13, 2000, http://www.microsoft.com/technet/security/topics/issues/fipsdrsp.mspx.*

(Continued)

Primary Examiner—Gilberto Barron, Jr.
Assistant Examiner—Kristin Derwich
(74) Attorney, Agent, or Firm—Law Offices of Albert S. Michalik, PLLC

(57) ABSTRACT

A system and method for encryption and decryption of files. The system and method operate in conjunction with the file system to transparently encrypt and decrypt files in using a public key-private key pair encryption scheme. When a user puts a file in an encrypted directory or encrypts a file, data writes to the disk for that file are encrypted with a random file encryption key generated from a random number and encrypted with the public key of a user and the public key of at least one recovery agent. The encrypted key information is stored with the file, whereby the user or a recovery agent can decrypt the file data using a private key. With a correct private key, encrypted reads are decrypted transparently by the file system and returned to the user. One or more selectable encryption and decryption algorithms may be provided via interchangeable cryptographic modules.

24 Claims, 20 Drawing Sheets

U.S. PATENT DOCUMENTS

| | | | |
|---|---|---|---|
| 6,249,866 B1 * | 6/2001 | Brundrett et al. | 713/165 |
| 6,578,069 B1 | 6/2003 | Hopmann et al. | 709/203 |
| 6,629,127 B1 | 9/2003 | Deen et al. | 709/203 |
| 6,654,794 B1 | 11/2003 | French | 709/217 |
| 6,704,871 B1 * | 3/2004 | Kaplan et al. | 713/192 |
| 6,714,968 B1 | 3/2004 | Prust | 709/219 |
| 6,732,361 B1 | 5/2004 | Andreoli et al. | 719/313 |
| 6,760,886 B1 | 7/2004 | Nadon et al. | 715/500.1 |
| 6,842,770 B1 | 1/2005 | Serlet et al. | 709/203 |
| 2002/0168616 A1 | 11/2002 | Chan et al. | 434/118 |

OTHER PUBLICATIONS

Anonymous, Copy of International Search Report in Corresponding PCT Application No. PCT/US98/19049.

Anonymous, Copy of Written Opinion in Corresponding PCT Application No. PCT/US98/19049.

Denning, Dorothy E.; Branstad, Dennis K, "A Taxonomy for Key Escrow Encryption Systems" *Communications of the ACM* vol. 39, No. 3: 34-39. Mar. 1996.

Blaze, Matt. "Cryptographic File System for Unix" *First ACM Conference* Nov. 3-5, 1993.

Rivest, R. L.; Adleman, L. "A Method for Obtaining Digital Signatures and Public Key Cryptosystems" *Communications of the ACM* vol. 21, No. 2: 120-126. Feb. 1978.

Cattaneo, G.; Persiano, G. Design and Implementation of a Transparent Cryptographic File System for Unix *Dep. Informatica ed Appl., Universita di Salerno*, Baronissi (SA) -Italy.

Blaze, Matt. "Key element in an Encrypting File System" *1994 Summer USENIX* 27-35, Boston, MA Jun. 6-10, 1994.

Eastlake, et al. "RFC 1750: Randomness Recommendations for Security" *GlobeCom Network* Dec. 1-28, 1994.

Editors: Foot, G. H.; Sewell, R. F. "The Public Key Cryptography" vol. 1, No. 1, Jan. 1991.

Editors, Foot, G. H.; Sewell, R. F. "The Public Key" vol. 1, No. 2, Jan. 1991.

* cited by examiner

ENCRYPTING FILE SYSTEM AND METHOD

CROSS-REFERENCE TO RELATED APPLICATION

The present application is a continuation-in-part of U.S. patent application Ser. No. 08/931,774 filed Sep. 16, 1997 now U.S. Pat. No. 6,249,886, herein incorporated by reference.

FIELD OF THE INVENTION

The invention relates generally to computer storage techniques, and more particularly to an encrypting file system and method for computer systems.

BACKGROUND OF THE INVENTION

The protection of sensitive data has become a very important issue to users of computers. For example, data such as personnel records or customer credit card numbers may be stored on a computer, and if that computer (or even just the storage media) is stolen, the thief has access to the sensitive information. This is especially troublesome with laptop computers, which are frequently stolen by sophisticated thieves. Moreover, information may be misappropriated even when the storage media is not physically taken, such as when an unauthorized individual gains access to a computer (possibly when that computer is simply online) and copies information from some or all of its files. Those authorized to access the sensitive information may not even know that it has been copied.

To protect information, one type of security procedure involves encrypting the data, so that even if the data falls into the wrong hands, it cannot be read without a key. Many application level programs provide some form of such encryption. While better than nothing, however, such existing encryption schemes suffer from myriad problems.

One serious problem is that the encrypted data is still susceptible to a number of attacks. More particularly, applications providing encryption functions use password/passphrase derived keys, which are weak by definition due to dictionary attacks and the like. Moreover, attacks improve over time, particularly as hardware improves, and what was once considered safe by one application may no longer be safe.

Also, users tend to lose keys. The problem of lost keys can be eliminated by spreading the key around to multiple users, but this further compromises security. Moreover, each file may have a different password, making recall difficult. Accordingly, for convenience many users will encrypt many files with the same password key used to encrypt one file, whereby divulging a key to another person for one file often results in inadvertently giving that person the key to many other files. Moreover, in order to remove or add user access to one or more files, each file (and every copy of each file) must be decrypted and re-encrypted with the new key, and then redistributed.

Yet another significant problem is that the encryption process is inconvenient, requiring the encrypting and decrypting of each such file during each use. As a result, many typical users tend to neglect security concerns rather than bother with encrypting various files.

Another serious problem is that most applications create temporary files while a user works on a document. These temporary files are not always removed after the original is saved, leaving the sensitive data vulnerable. Also, with contemporary operating systems, application-level encryption runs in the user mode, and thus all the data, including the user's encryption key, can make into the page file, making the task of locating a key quite easy. Lastly, most file encryption applications have built-in encryption algorithms, and are therefore not extendible or flexible in supporting different or multiple algorithms that would allow users to update encryption algorithms as such algorithms improve over time, or to select from among encryption algorithms for particular data, e.g., to make a speed versus strength tradeoff based on the sensitivity of the data being encrypted.

SUMMARY OF THE INVENTION

Briefly, the present invention provides a system and method for encrypting or decrypting data in a file. Whenever a user specifies that a file or its parent directory is encrypted, the encrypting file system receives an encryption key associated with the file. Then, when the system receives a request to write any plaintext file data to disk in an encrypted manner, the file system receives the file data, encrypts the file data into encrypted file data using the encryption key, and writes the encrypted file data to the disk. Conversely, when the system receives a request to read encrypted file data from the disk, the file system reads the encrypted file data, decrypts the read data into decrypted file data using the encryption key, and returns the decrypted file data to the user. The encryption and decryption are automatically performed at the file system level, and are transparent to the user.

The encryption key is a random number encrypted by the public key of at least one user and at least one recovery agent. These keys are stored with the file, whereby the file can always be decrypted by the private key of either a user or a recovery agent.

The encryption algorithm may be provided in an interchangeable module comprising a set of one or more selectable algorithms. The module may be replaced by an updated module and/or one having a different algorithm set therein.

Other benefits and advantages will become apparent from the following detailed description when taken in conjunction with the drawings, in which:

DETAILED DESCRIPTION OF THE PREFERRED EMBODIMENT

General Architecture

Figure 1:
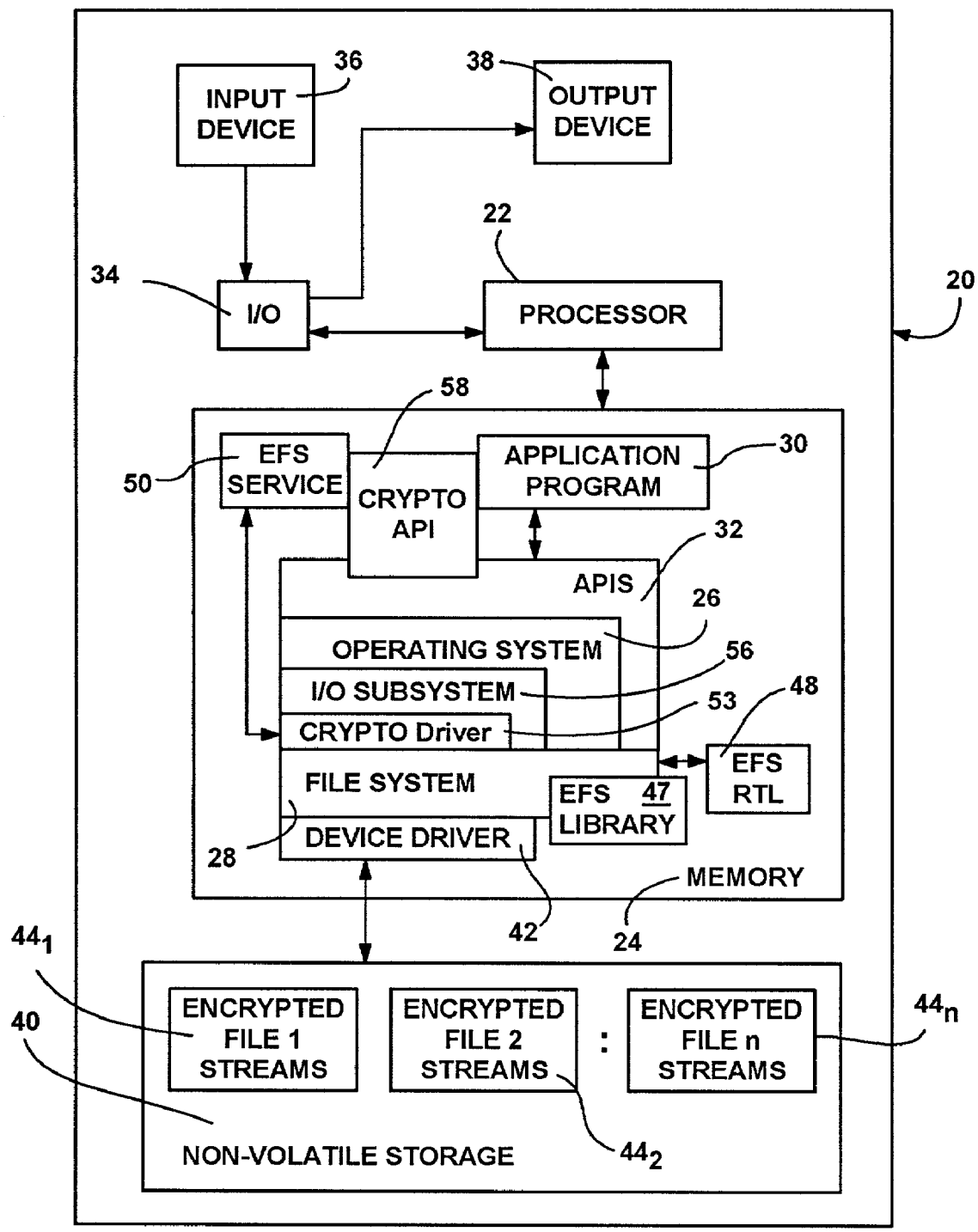
FIG. 1 is a block diagram representing a computer system into which the present invention may be incorporated.

Turning to the drawings and referring first to FIG. 1, there is shown a computer system 20 generally designated 20 into which the present invention may be incorporated. The illustrated computer system 20 may be a server, a workstation, or a combination thereof, and may be connected in a known manner to one or more other computer-based resources. Of course, as will become apparent, the invention is not limited to any particular type of computer or network architecture, and may be incorporated into a stand-alone personal computer or the like.

As shown in FIG. 1, the computer system 20 includes a processor 22 connected to a memory 24 having an operating system 26 loaded therein. One suitable operating system 26 is Microsoft Corporation's Windows® 2000 operating system. The computer 20 has a file system 28 such as the Windows NT File system 28 (NTFS 28) associated with or included within the operating system 26. However, as can be appreciated, the present invention is not limited to any particular operating system and/or file system, but for clarity the present invention will be hereinafter described with reference to Windows® 2000 and NTFS 28. At least one application program 30 in the memory 24 interfaces with the operating system 26 and the file system 28 through application programming interfaces (APIs) 32.

The computer system 20 also includes input-output (I/O) circuitry 34 for connecting the computer system 20 to one or more networked devices, to one or more input devices 36 such as a keyboard and/or mouse, and/or to one or more output devices 38 such as a monitor and/or speakers. The computer system 20 also includes a non-volatile storage device 40 such as a hard disk drive. As can be appreciated, the non-volatile storage device 40 may also operate in conjunction with the random access memory of the memory 24 to provide a large amount of virtual memory via swapping techniques.

The file system 28 connects through a device driver 42 to communicate with the non-volatile storage device 40, to manage the files thereon, and generally contains methods for (1) storing, referencing, sharing and securing files, (2) accessing file data and (3) maintaining file integrity. Notwithstanding, there is not always a clear distinction between a file system 28 and its associated operating system, particularly with those file systems 28 contained within an operating system. Accordingly, it is understood that any or all of the processes or steps attributed herein to the file system 28 may alternatively be performed by the operating system 26, and vice-versa.

The non-volatile storage 40 stores a number of files $44_1$–$44_n$, which, when NTFS serves as the file system 28, have their data organized in attribute data streams. An NTFS file control block (FCB) associated with each file maintains information identifying the data streams belonging thereto. Windows NT and NTFS 28 are described in the texts, Inside Windows NT, by Helen Custer, Microsoft Press (1993) and Inside the Windows NT File System, Helen Custer, Microsoft Press (1994). As shown in FIG. 1 and as described below, in accordance with the present invention, at least some of the files $44_1$–$44_n$ are stored with encrypted data.

EFS Component

In accordance with one aspect of the present invention, to encrypt and decrypt the files, as shown in FIG. 2A, an encrypting file system is provided, in one implementation comprising an Encrypting File System (EFS) linked library 47, (e.g., DLL), an EFS runtime library (FSRTL 48) 48 and an EFS service 50. The linked library 47 provides relatively tight integration with the file system, (as opposed to an installable filter driver model such as described in parent U.S. patent application Ser. No. 08/931,774), e.g., both are loaded together (and not according to a registry setting). Notwithstanding, the present invention is not limited to any particular implementation, but will work with a linked library, driver, or virtually any other mechanism including directly incorporating the encryption functions into the file system code.

The EFS linked library 47 registers with the file system 28, whereby the file system provides encryption functionality that is transparent (e.g., to an application) by calling the EFS linked library's functions, listed in a function table $47_A$ or the like acquired by the file system during registration. Note that instead of linking in this manner, these functions may be incorporated into the file system 28, however the modularity of these components provides benefits normally associated with modularity. For purposes of this description, once registered, the EFS linked library 47 generally may be considered part of the file system 28. Further, note that if for some reason the EFS linked library 47 cannot link to and register with the file system, (e.g., errors may occur during the initialization phase), then the file system will not provide encryption and decryption functionality. For example, a user will not be able to access an encrypted file (until the library is properly initialized).

During initialization, the EFS linked library 47 registers file system runtime library callback routines (FSRTL 48 routines) with the NTFS 28, maintained in the function table $47_A$. As described below, NTFS 28 uses these FSRTL 48 routines to call back to obtain file encryption related services.

The EFS linked library 47 provides the support to communicate with the user mode EFS service 50 running as part of the security subsystem. During initialization (or alternatively when encryption or decryption is first needed), the EFS linked library 47 communicates with the EFS service 50 using a GenerateSessionKey interface, to establish a symmetric session key that is used to communicate securely between the EFS linked library 47 and the EFS service 50. Data communicated between the two is encrypted using this session key. This session key is also used by callouts to the FSRTL 48 to decrypt I/O controls from the EFS service 50.

During open of an encrypted file, the EFS linked library 47 communicates with the EFS service 50 by passing it the file metadata, including the data decryption and data recovery fields, (FIGS. 3–5, described below), to get back the file encryption key and any updates to the file metadata. The file metadata may be updated because the user may change to a new key, or the recovery agent's keys might get updated. The EFS linked library 47 passes this information to FSRTL 48.

During encryption of a plaintext file/directory or creation of a new encrypted file, the EFS linked library 47 communicates with the EFS service 50 to get a new file encryption key, and encryption metadata for the encrypted file. The EFS linked library 47 also passes this information to the FSRTL 48.

EFS FSRTL

The FSRTL 48 is a module that implements NTFS callouts to handle various file system 28 operations such as reads, writes, and opens, on encrypted files and directories, as well as operations to encrypt, decrypt, and recover file data when it is written to or read from disk. To this end, the present invention provides a callout mechanism including an interface between NTFS 28 and the FSRTL 48. As described in more detail below, this interface is generic to any appropriate library (and driver) that transform data, including the ones described herein that encrypt data, and thus the interface between NTFS 28 and FSRTL 48 is more accurately referred to as a data transformation interface 52. For example, an indexing driver could use this interface to monitor all writes to disk and develop an index based on those writes. However, as can be appreciated, a dedicated encryption interface may be alternatively provided. Note that in one preferred implementation the interface 52 (and other interfaces herein) is generic to allow for other EFS-like packages to be supplied).

Operations between the EFS linked library 47 and FSRTL 48 include writing EFS attribute data (decryption data and recovery fields) as file attributes, and communicating a file encryption key computed in the EFS service 50 to FSRTL 48, such that it can be set up in the context of an open file. This file context is then used for transparent encryption and decryption on writes and reads of file data to and from the non-volatile storage 24.

The data transformation interface 52 is capable of interfacing to any engine or driver that transforms the data in virtually any way, but for purposes herein the interface 52 will be described as interfacing the EFS linked library 47 to the file system 28 for accomplishing data encryption. Notwithstanding, the data transformation interface is not limited to data encryption, but is appropriate for accomplishing virtually any type of data alteration. At present, however, this transformation model supports in-place data transformation wherein the data takes at least no more space than the original plain text. In any event, the EFS linked library 47 registers these callbacks with the file system 28, whereby the file system 28 uses the registered EFS callback functions at appropriate times to carry out the various encrypting and decrypting tasks that the user requests.

Although not necessary to the invention, for convenience, the FSRTL 48 is stored in a common file with the EFS linked library 47. Indeed, although the EFS linked library 47 and FSRTL 48 are implemented as a single component, they do not communicate directly, but instead use the NTFS file control callout mechanism, i.e., the EFS linked library 47 can effectively call the FSRTL 48. The use of the NTFS callout mechanism ensures that NTFS 28 participates in all file operations, which avoids conditions such as where two users are locked, each user waiting for the release of the other's file.

The data transformation interface 52 includes a number of function pointers, or callbacks. A first callback which the file system 28 uses, the FileCreate callback, tells the registered EFS functions that a stream is being created or opened. The actions that EFS linked library 47 takes at this point (e.g., determining if a user has access if the file is an existing file or getting the metadata stream for a new file) are described in more detail below.

When an application opens or creates a file, the I/O subsystem 56 determines the file is of a certain file system, e.g., an NTFS 28 file, and passes the request on to NTFS 28. NTFS 28 determines whether EFS may be interested in the file, e.g., if the file is created in an encrypted directory or if a stream is created or attached to an encrypted file. IF NTFS 28 determines that the file is of interest to EFS, and sees that the EFS linked library 47 is registered therewith, NTFS 28 calls a registered EFS function, i.e., the FileCreate callback. If the request is a file open request on an existing file, FSRTL 48 reads the file metadata from the file attribute and fills up a context block (e.g., block $98_1$ of FIG. 7, previously allocated by the EFS linked library 47, as described below) to pass back that information to the EFS linked library 47. When the call returns from NTFS 28, the EFS linked library 47 takes the metadata information and communicates with the EFS service 50 to extract the file encryption key 60 from the metadata. This information is then returned by the EFS linked library 47 to NTFS 28 by another FSRTL 48 interface, FileControl, described below, which sets up a key context 96 on the file being opened. This key context 96 is thereafter retained by NTFS 28 for future calls to the EFS linked library 47 until the file is closed. If the file metadata is updated, the updated metadata is also re-written to the attributes by the registered EFS functions through NTFS callbacks.

If a new file is created, the FileCreate call results in the FSRTL 48 filling up the context buffer $98_1$ with a request for a new file encryption key and metadata. The FSRTL 48 then passes the context buffer $98_1$ back to the EFS linked library 47. The EFS linked library 47 takes this information and communicates with the EFS service 50 to obtain a new file encryption key and new file metadata from the EFS service 50. Using a file control callback (described below), the EFS linked library 47 returns this information to the FSRTL 48, whereby, using NtOfs function calls, the FSRTL 48 sets up the key context 98 on the file being created and writes the file metadata. The NtOfs API is a set of NTFS 28 function calls that allow the EFS linked library 47 to call into the file system 28 to manipulate the data streams containing the encryption meta data.

Another callback, FileSystemControl_1, is called by NTFS 28 in response to the EFS linked library 47 request when a user is setting the encryption state of a file (EFS_SET_ENCRYPT), either marking it as encrypted or decrypted. In response, NTFS 28 sets or clears the encryption bit, and the EFS linked library 47 generates any necessary key storage. EFS_SET_ENCRYPT also originates in the EFS service 50 when a plaintext file begins to be encrypted, whereby the file state is modified such that no other operations are allowed on the file until the encryption is completed.

NTFS 28 also calls the FileSystemControl_2 interface with various encryption driver-specific file control requests from the EFS linked library 47. Note that NTFS 28 takes no action with these callbacks other than to simply pass the call to the FSRTL 48. The file control requests include EFS_SET_ATTRIBUTE, which comes from the EFS filter EFS linked library 47 when it wants to write new or updated file metadata, and EFS_GET_ATTRIBUTE, which may come from the EFS linked library 47 or a user mode application 30 to query the file metadata. The information includes the list of user public keys and recovery agent public keys (described below) that are used to encrypt the file encryption key. Another request, EFS_DECRYPT_BEGIN, comes from the EFS service 50 when it starts decrypting an encrypted file. In response, the state of the file is modified such that no other operations are allowed on the file until the decryption is completed. EFS_DEL_ATTRIBUTE is a request originating in the EFS service 50 when it finishes decrypting an entire encrypted file, and wants to delete the file metadata and associated attribute. The EFS_ENCRYPT_DONE request also comes from the EFS service 50 when it successfully completes the file encryption. The file state is modified to allow any operations from this point on.

EFS_OVERWRITE_ATTRIBUTE comes from the EFS service 50 when an encryption file is restored from its backup format. The EFS service 50 supplies the file metadata that needs to overwrite any existing metadata on the file. This request is also associated with the deletion of any key context 96 associated with that file, such that no reads or writes can proceed while the file is being restored.

The FileSystemControl_2 interface is also called by the file system 28 in response to the FSCTL_ENCRYPTION_FSCTL_IO, also described below. This provides a means for the EFS linked library 47 to have NTFS 28 call the EFS linked library 47 (itself), such as when NTFS 28 recognizes that a file is in a certain state corresponding to a state for which the EFS linked library 47 is waiting.

The file system 28 directly uses the callback, AfterReadProcess after it has read some data from the disk for an encrypted file, and before returning it to the user. The AfterReadProcess function decrypts the data on the fly in response to this callback. The read operation is described in more detail below with respect to FIG. 20.

Conversely, BeforeWriteProcess is called by the file system 28 before it writes some data to the disk for an encrypted file. The function encrypts the data as a result of this callback. The write operation is described in more detail below with respect to FIG. 21.

The CleanUp callback is called by the file system 28 when NTFS 28 is freeing any resources associated with a stream. At this time, the EFS linked library 47 frees up any memory resources it was using, such as to store keys and the like. When NTFS 28 receives its last close on a stream, NTFS 28 performs its normal operations to free up anything stored in memory to keep track of this open file, including the key context 96. In addition, the file system 28 calls the EFS linked library 47 with the context block 98, giving it the opportunity to free up any memory it was consuming for this file, e.g., the context block 98.

The AttachVolume callback is called by a file system 28 (during the first user operation involving encryption), as described above. In response, the EFS linked library 47 notifies the I/O subsystem that it wants to attach to the device object representing that volume, thereby logically placing itself above NTFS 28 for that volume so that the I/O subsystem will pass information to the EFS linked library 47 first. DismountVolume is called by a file system 28 when a volume is being dismounted, either because a user wishes to eject or remove the drive, or because the system is being shut down. In response to the DismountVolume call, an encryption library or driver may free any memory resources that were allocated during the AttachVolume callback. However, it should be noted that the EFS linked library 47 ordinarily detaches itself and frees any resources when notified by the I/O subsystem of a volume dismount, but the DismountVolume callback is provided anyway to provide additional flexibility.

EFS Service

Figure 2:
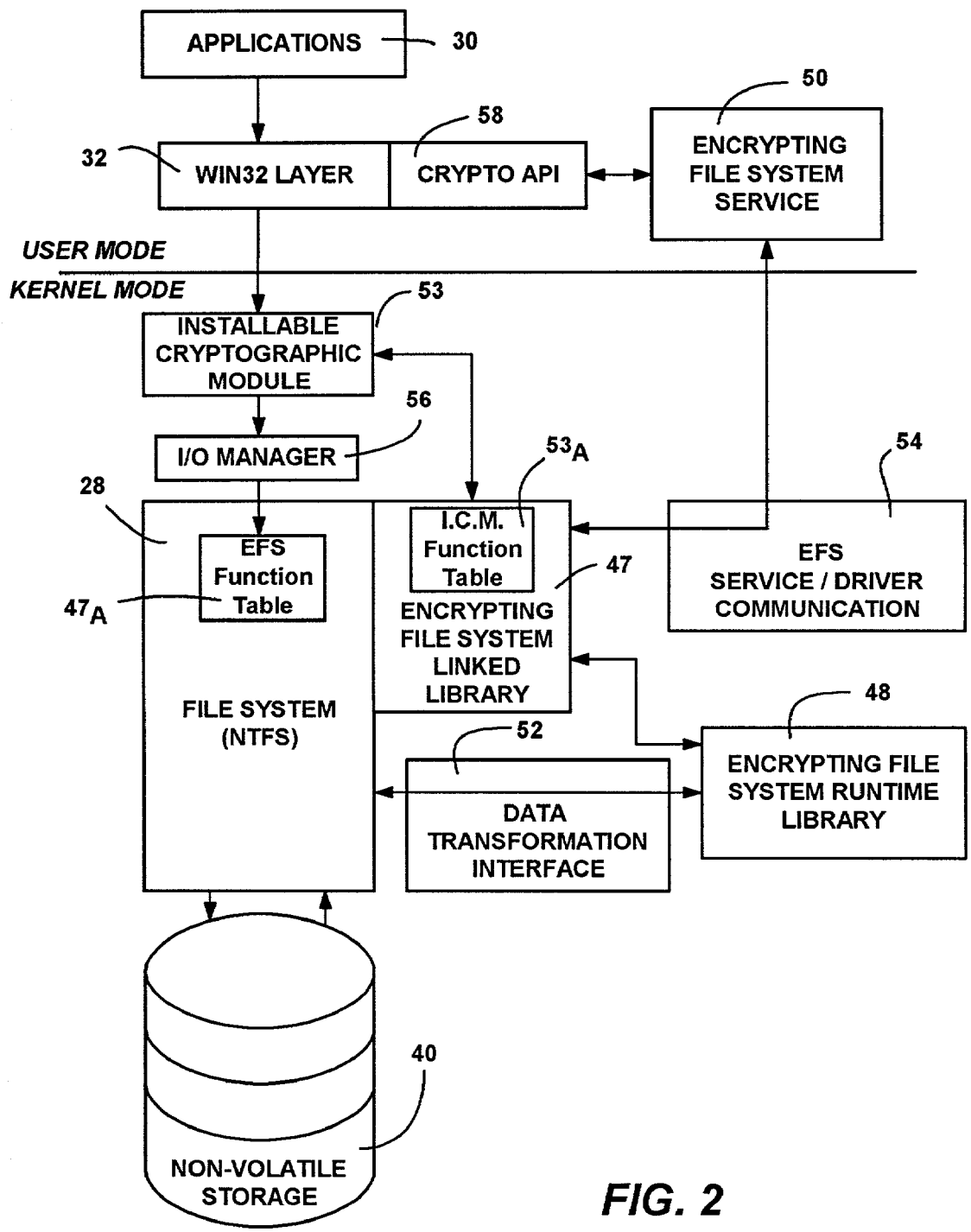
FIG. 2 is a block diagram representing a general architecture of components capable of implementing of the present invention.

The EFS service 50 is part of the Windows NT security subsystem. As represented in FIG. 2 as EFS service 50/Driver Communication 54, the EFS service 50 uses the existing local procedure call communication port between a Local Security Authority (LSA) and the kernel mode security reference monitor to communicate with the EFS linked library 47. In the user mode, the EFS service 50 24 interfaces with Microsoft's Cryptography API, CryptoAPI 58, to provide file encryption keys, and generate decryption field information.

The EFS service 50 also provides support for Win32 APIs 32, which are programming interfaces for encrypt, decrypt, recover and provide support for importing and exporting encrypted files. Importing and exporting encrypted files allows users to convert the files into opaque data (encrypted) for operations such as backup, restore, and general file transfer purposes as described below. The Win32 APIs 32 provide programming interfaces for encrypting plain text files, decrypting or recovering ciphertext files, and importing and exporting encrypted files (without decrypting them first). These APIs 32 are supported in a standard system DLL, advapi32.dll.

The EFS service 50 provides a number of services, including generating a session key and exchanging it with the EFS linked library 47 and the FSRTL 48. Based on the EFS linked library 47 request, the EFS service 50 generates a cryptographically strong session key (using CryptoAPI) and communicates it to the driver and FSRTL 48. The EFS service 50 also generates the file encryption keys in fields stored with the file (the Data Decryption Field, or DDF, and the Data Recovery Field, or DRF, described below with reference to FIGS. 3–5) using the user's and recovery agents' public key defined for EFS. When the EFS linked library 47 requests a new file encryption key, the EFS service 50 generates this information using CryptoAPI and returns it to the EFS linked library 47.

The EFS service 50 also extracts the file encryption key, i.e., when the EFS linked library 47 requests this operation, the EFS linked library 47 supplies the file metadata, including the DDF and DRF key fields. Based on that information, the EFS service 50 sequentially searches the DDF and (if necessary) the DRF key fields to extract the name of the user's key therefrom, and accesses its private portion via the CryptoAPI provider 58. If successful, (as described in more detail below), it passes the encrypted file encryption key to the provider for decryption. The service verifies that the decryption was correct (as also described below), and also verifies that the keys used in the file metadata are up to date. If the keys are not up to date, the service regenerates the metadata (DDF and/or DRF) and returns the extracted file encryption key and the metadata back to the EFS linked library 47.

When the EFS linked library 47 is loaded by NTFS 28, it first initializes its structures, and reserves some space to ensure that some memory is always available thereto. Then, the EFS linked library 47 registers itself with NTFS 28. Lastly, to synchronize with the driver, the EFS linked library 47 attempts to create a new event. If the event is successfully created, this indicates that the EFS service 50 has not been initialized and the EFS linked library 47 has been loaded first. If successful, the EFS linked library 47 then creates a thread waiting on the event to be signaled. Later, when the event is signaled, i.e., the EFS service 50 is ready to communicate, the EFS linked library 47 calls the EFS service 50 to get the session key. Once the session key has been transferred from the EFS service 50 to the EFS linked library 47, and the EFS service 50 and the EFS linked library 47 are synchronized. Note that if the event was not successfully created, it is ordinarily because the EFS service 50 was already initialized, in which event the EFS linked library 47 simply makes the call to get the session key.

In the situation where the EFS service 50 was loaded first, the EFS service 50 tries to create a new event. If the event is successfully created, then the EFS linked library 47 has not been initialized. The EFS service 50 generates the session key without waiting on the event. Later, when the EFS linked library 47 is loaded, the EFS service 50 will be called by the EFS linked library 47 to provide the session key thereto. When the EFS service 50 provides the session key, the EFS service 50 closes the event which was created earlier by the EFS service 50, and the EFS service 50 and the EFS linked library 47 are synchronized. Note that if the event was not successfully created, it is ordinarily because the EFS linked library 47 was already initialized, in which event the EFS service 50 instead opens the event and signals the event to let the EFS linked library 47 know that the EFS service 50 is ready. Thereafter the EFS service 50 is asked for the session key by the EFS linked library 47, and the synchronization is done.

System APIS

Figure 22:
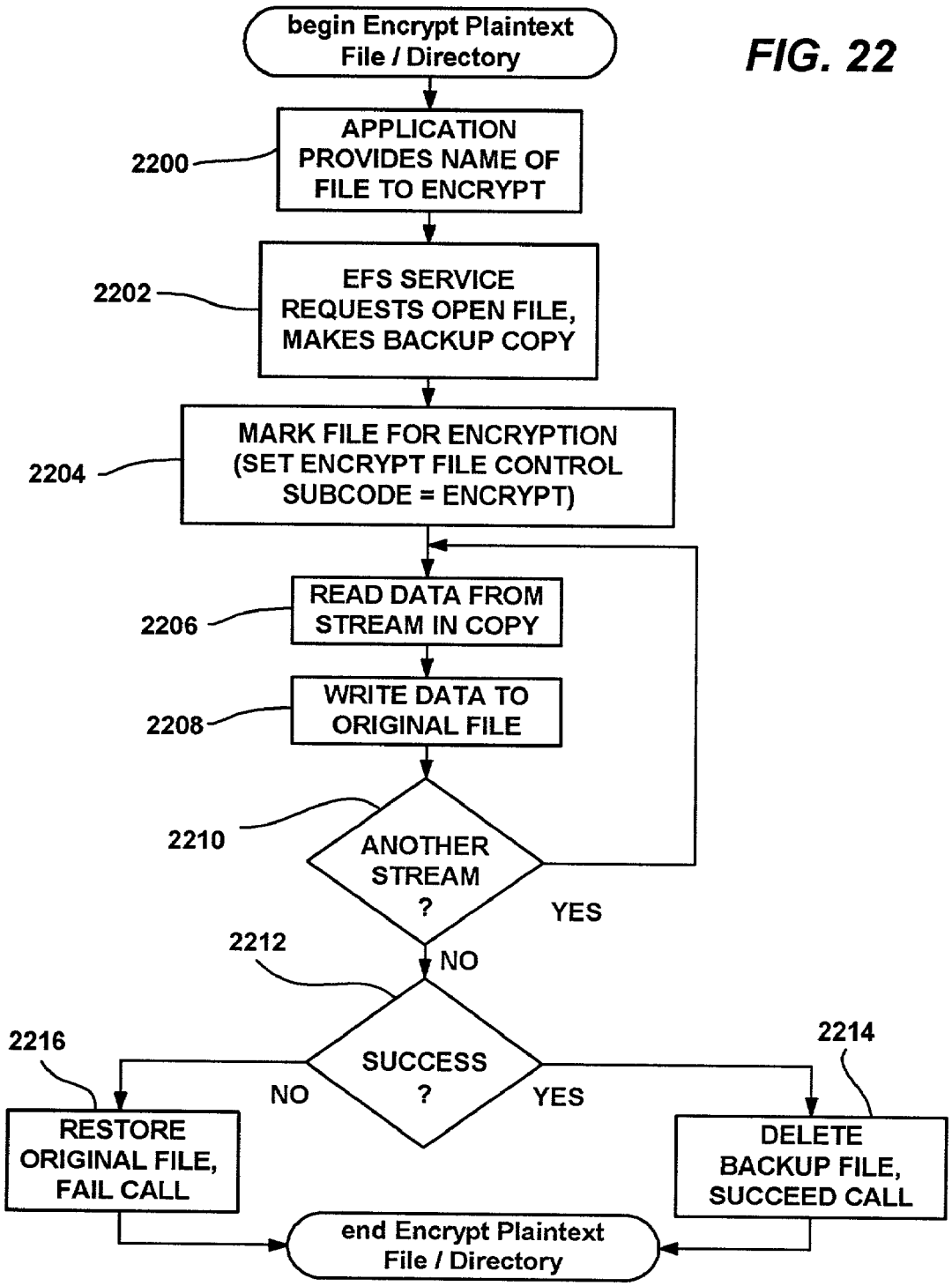
FIG. 22 is a flow diagram representing steps taken by the various components to handle a user request to encrypt a stored plaintext file.
Figure 23:
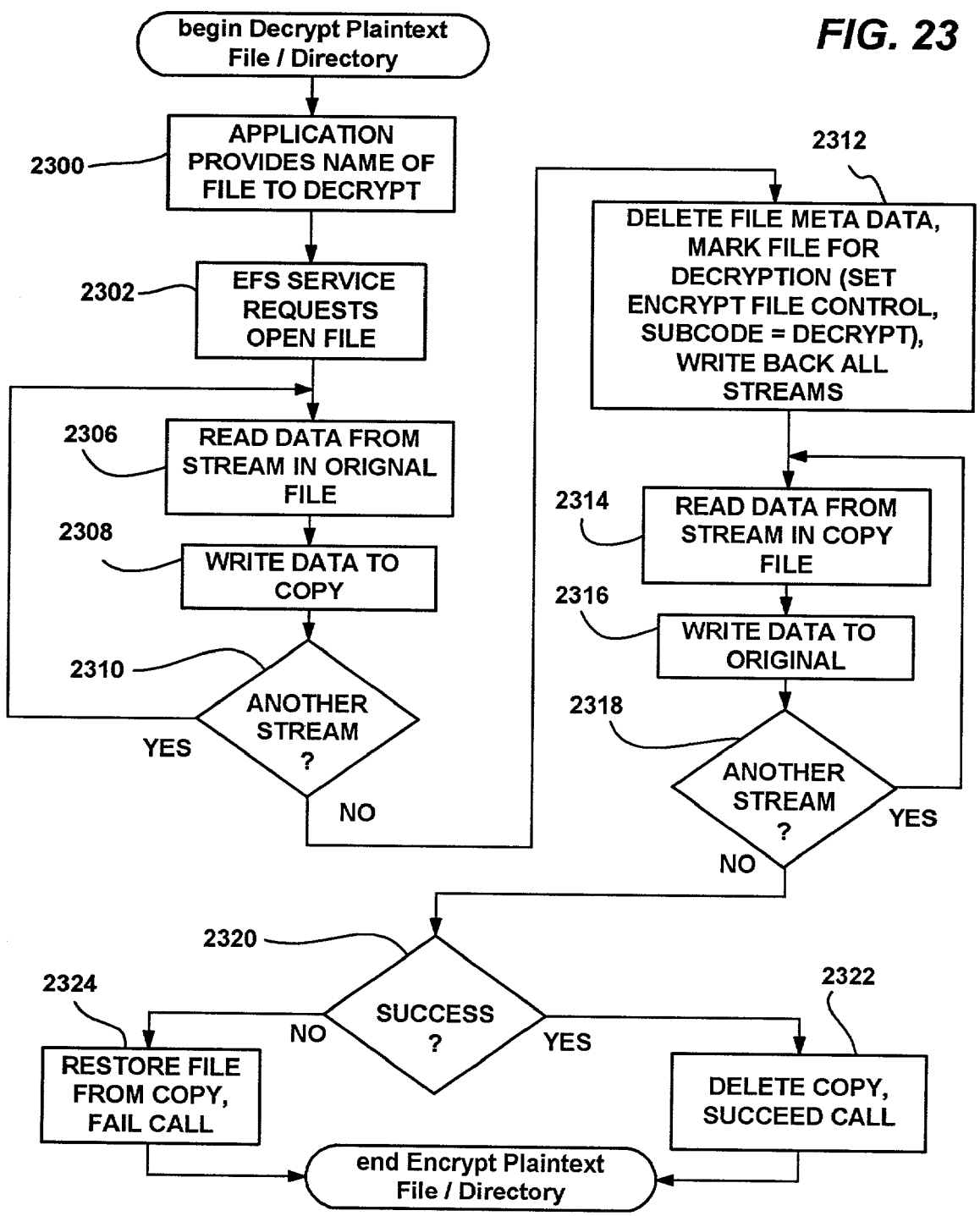
FIG. 23 is a flow diagram representing steps taken by the various components to handle a user request to decrypt a stored encrypted file.

As described in more detail below with particular respect to FIGS. 22–23, the EFS service 50 also provides a number of other user mode interfaces. These interfaces work closely with system APIs (e.g., WIN32 or the like) to enable the user to perform operations such as convert an existing plaintext file to an encrypted file, convert an encrypted file to a plaintext file, and provide a backup and restore mechanism. By way of example, the Win32 interfaces 32 work with the EFS service 50 to expose EFS functionality, and include EncryptFile, which is a wrapper that calls into the interface provided by the EFS service 50 to do file encryption (FIG. 22). Another interface, DecryptFile, is a wrapper that similarly calls into the interface provided by EFS service 50 to do file decryption/recovery (FIG. 23).

A Backup/Restore mechanism is also provided in the system APIs, which enables users and backup operators to backup encrypted files without decryption. To this end, an OpenRawFile interface allows the user to open an encrypted file without read access, and without setting up a file encryption key to do transparent reads and writes. For these operations, NTFS 28 recognizes the access level and does not call the encryption EFS linked library 47 to look up a key for this file, nor to decrypt reads nor encrypt writes. The only operations allowed on a file opened via this interface are file controls. Thus, a ReadRawFile interface allows the user to read all the data from the file, including the encryption metadata, as a contiguous opaque stream that can be backed up and later restored. A WriteRawFile interface allows the user to write all the data to the file from its backup, including the encryption metadata, to re-create the encrypted file. Lastly, a CloseRawFile is provided that allows the user to close the file which was opened raw by OpenRawFile.

A FileControl interface allows the Win32 APIs that provide the backup and restore mechanism to read and write raw encrypted data. Note that such raw data reads and writes are from/to NTFS 28 direct to/from the disk (storage); EFS becomes involved because the EFS service 50 and the EFS linked library 47 share the common session key, and all file controls need to be verified (as described below). For backing up the file, the Win32 APIs read the EFS metadata via an EFS file control, which translates into the FileSystemControl_2 that returns the EFS stream. Then, NTFS 28 file controls are called to read the actual file data, which is packaged into an opaque stream and written out. To (gradually) restore the file, the reverse process is performed. An EFS file control is called to identify a first stream and another EFS file control to write the raw data back.

Data Encryption

Figure 3:
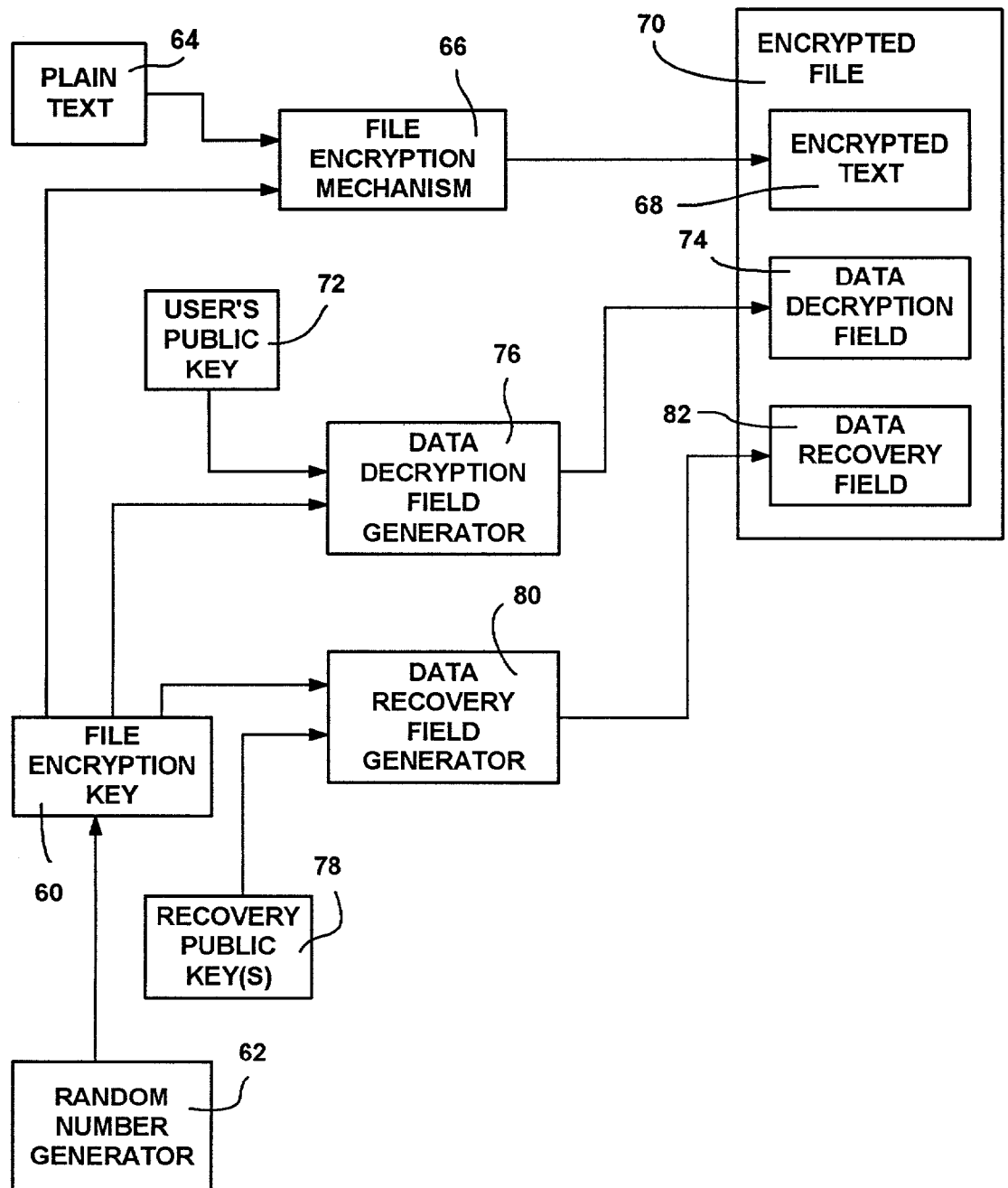
FIG. 3 is a block diagram conceptually representing various logical components used in the encryption of data.
Figure 4:
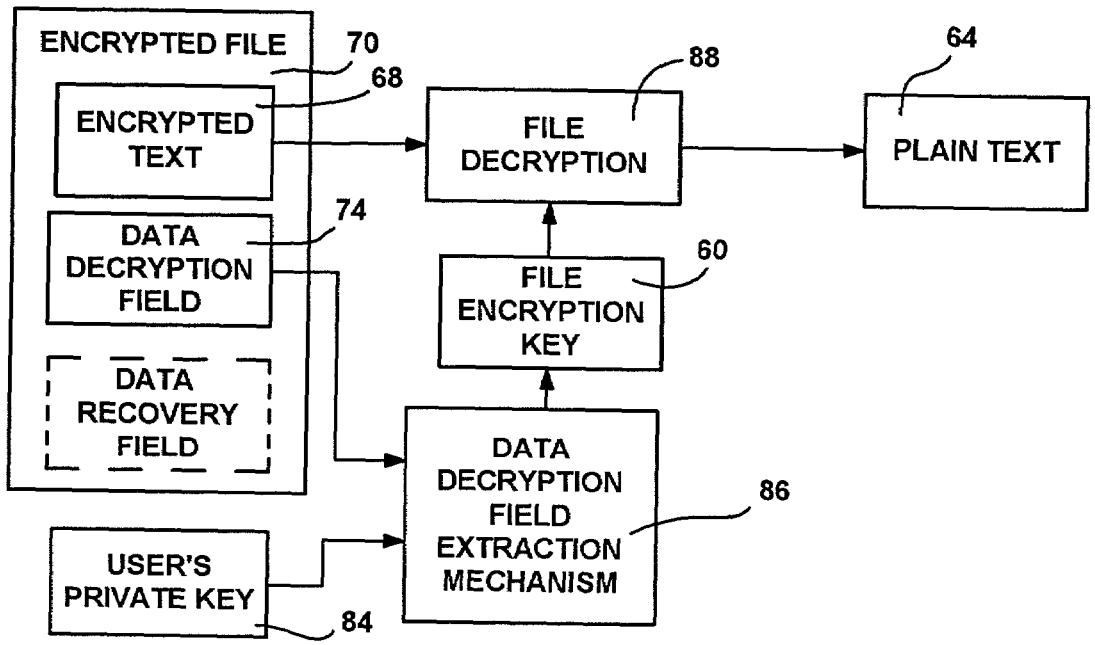
FIG. 4 is a block diagram conceptually representing various logical components used in the decryption of data.
Figure 5:
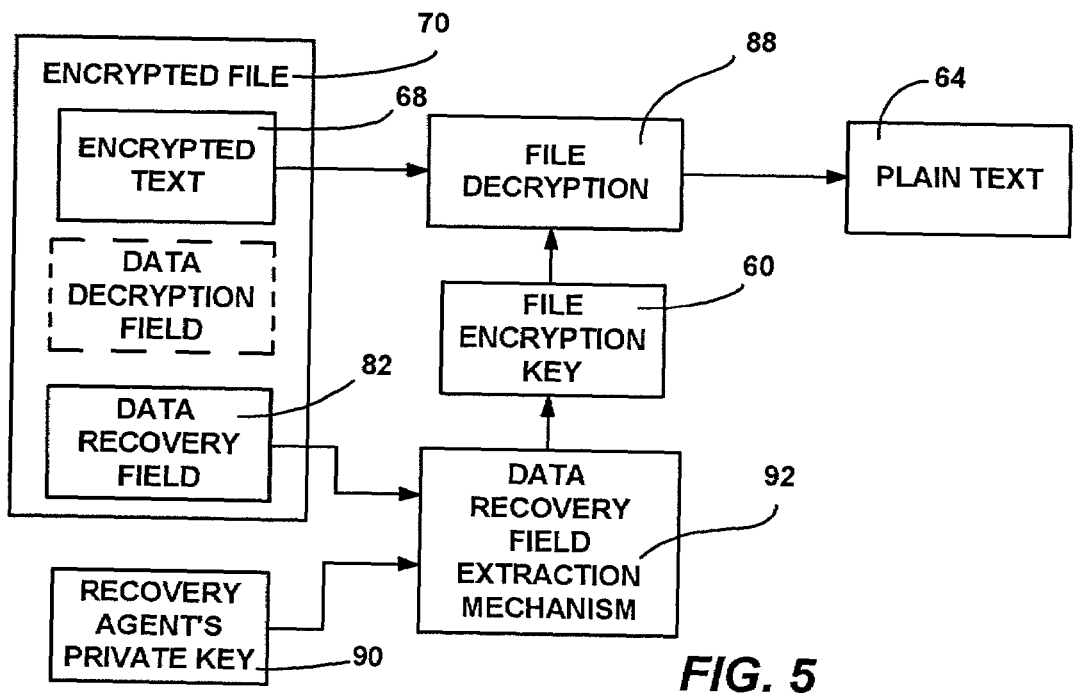
FIG. 5 is a block diagram conceptually representing various logical components used in the recovery of encrypted data.

As conceptually represented in FIGS. 3–5, the present invention implements data encryption and decryption using a public key-based scheme. To this end, file data is encrypted using a fast symmetric algorithm with a file encryption key (FEK) 60 (FIG. 3). The FEK 60 is a randomly generated key of a certain length required by the selected algorithm, or as otherwise required if the algorithm supports variable length keys. As represented in FIG. 3, a random number generator 62 generates the FEK 60. To encrypt the file data using the FEK 60, the plain text 64 of the file is encrypted by a file encryption mechanism 66 using an appropriate algorithm (e.g., DES) and written as encrypted text 68 to an encrypted file 70.

In accordance with another aspect of the present invention, and as shown in FIG. 3, the randomly generated FEK 60 is itself encrypted with the public key 72 of at least one user, and stored with the encrypted file 70 in a special EFS attribute called the Data Decryption Field (DDF) 74. Using a suitable encryption algorithm, (e.g., RSA), a data decryption field generator 76 performs the key encryption. In keeping with public-key based schemes, the private portion of the user's key pair is only used during decryption, i.e., an encrypted FEK 60 in the data decryption field 74 is decrypted using the private portion of the key pair. The private portion 84 (FIG. 4) of a user key pair is safely stored in a separate location, such as on a smart card and/or other secure storage device. Note that encryption can also be done using a symmetric algorithm, such as a password-derived key, but while feasible, EFS preferably does not support such encryption because password-based schemes are inherently weak due to dictionary attacks and the like.

In accordance with one aspect of the present invention, as also represented in FIG. 3, the FEK 60 is also encrypted using one or more recovery public keys 78. The recovery key encryption public keys 78 belong to trusted persons, known as recovery agents, as specified by a recovery policy, described below. Similar to the FEK's encryption using the user's public key, the public portion of each recovery key pair is used to encrypt the FEK 60 using a data recovery field generator 80, (employing, for example, a suitable encryption algorithm, such as RSA, which need not be the same algorithm used to encrypt the FEK 60 with the user's public key). This list of encrypted FEKs is similarly stored along with the file 70 in a special EFS attribute called the Data Recovery Field (DRF) 82. Thus, only public portions of the recovery key pairs are needed for encryption of the FEK 60 in the DRF 82. Note that to facilitate proper operation, these public recovery keys are to be present at all times on an EFS system for normal file system 28 operations, since a user may wish to encrypt a file at any time. Recovery itself is expected to be a rare operation required only when users leave organizations, lose keys, and so on. As a result, recovery agents are also able to store the private portions 90 (FIG. 5) of the keys on smart cards, floppy disks, and/or other secure storage devices.

In keeping with the invention, the Encrypting File System architecture is not limited to any particular encryption algorithm, but rather is fully algorithm agile and may use any cryptography algorithm for the various encryption phases. As a result, the Encrypting File System of the present invention allows for the usage of better and better encryption algorithms as such algorithms advance technologically. Moreover, the user is able to choose from among available algorithms to select an algorithm having greater or less security (i.e., based on how sensitive the user thinks the information is) versus the speed of encryption and decryption, (i.e., more secure algorithms are generally slower). Thus, in the above description, DES is one such algorithm used to encrypt file data, while RSA is used to encrypt the FEK.

A choice of algorithms may be made available by providing the algorithm into an installable module separate from the file system and/or encrypting file system library (although, for example, a default algorithm may still be provided in the library). As generally represented in FIG. 2, a user can select an algorithm from an interchangeable (installable) cryptographic module 53 having a set of one or more suitable algorithms present therein. Alternatively, or in addition to, the algorithm set may be changed by replacing the interchangeable module with a different cryptographic module 53 containing a different algorithm set. For security, the interchangeable kernel mode cryptographic module 53 may be a kernel mode component, such as in the form of a single kernel mode export driver (a kernel-mode DLL). For example, the user (or an administrator) can choose a given encryption/decryption algorithm for all files by default, on a per-file or per-directory basis, and so on. Once saved, information stored with the encrypted file can identify which algorithm was used to encrypt the data, whereby the appropriate algorithm for decrypting the data can be automatically selected for existing files. In any event, EFS is aware of the appropriate algorithm, and can notify the cryptographic module as to which one to use, e.g., by calling a corresponding function of the module based on the algorithm or by passing an algorithm identifier to the cryptographic module.

By way of example, one such interchangeable kernel mode cryptographic module is a FIPS (Federal Information Processing Standards) system file, such as in the form of a single kernel mode export driver. The cryptographic boundary for this file is defined as the enclosure of the computer system on which the cryptographic module is to be executed.

To securely separate the interchangeable cryptographic module 53 from EFS library 47, the interchangeable cryptographic module 53 comprises a self-authenticating algorithm. The module 53 initializes before EFS, and does a self-check. When EFS initializes, the EFS library 47 calls the interchangeable cryptographic module 53 (driver) and receives a function table $53_A$ in return, and stores it. For example, in an NTFS system, the table is acquired by building a function table request IRP (I/O request packet) and then sending the IRP to the interchangeable cryptographic module 53, which in turn returns the table. Thereafter, when EFS performs encryption, EFS looks up the algorithm it will use in the function table, and uses it. Significantly, this provides a straightforward way for to change the algorithm and/or for an administrator or the like to replace an interchangeable cryptographic module 53 with an updated version. Such selection/replacement is independent and transparent to EFS, but allows EFS the flexibility to use different algorithms.

A preferred FIPS cryptographic module runs as a kernel mode export driver and encapsulates several different cryptographic algorithms in a cryptographic module that is accessible by other kernel mode drivers and can be linked into other kernel mode services (e.g., to permit the use of FIPS 140-1 Level 1 compliant cryptography). The cryptographic module 53 may rely on the operating system for the authentication of users. The keys created within the cryptographic module 53 for one user are not accessible to any other user via the cryptographic module 53.

Once initialized, to use, for example, a DES or Triple DES function of the installable cryptographic module 53, a kernel mode system service provides a respective DES or Triple DES key. Keys are not stored by the module 53, but zeroed after the cryptographic module 53 completes a respective DES or Triple DES function with the keys.

In general, to encrypt or decrypt data, the EFS library 47 calls a respective function (e.g., DES, 3DES) of the interchangeable cryptographic module 53 with a pointer to an input buffer containing the data, and a pointer to an output buffer, a pointer to the key and a parameter specifying whether encryption or decryption is desired. Hashing functions also may be provided in the same module 53, along with key generation (e.g., random keys), key entry and key output functions.

The following table summaries various states of a preferred FIPS interchangeable cryptographic module:

| | Current State | Input | Output | Next State | Comment |
|---|---|---|---|---|---|
| 1 | Power Up | FIPS.SYS loads | NO_ERROR | Initialized | The Power Up state is entered when OS Loader calls the FIP.SYS driver entry point function DriverEntry() during system boot. |
| 2 | Power Up | FIPS.SYS not found | STATUS_UN SUCCESSFUL | Init Error | (see comment for State 1 above) |
| 2 | PowerUp | DES MAC check on cryptographic provider fails | STATUS_UN SUCCESSFUL | Init Error | (see comment for State 1 above) |

-continued

| Current State | Input | Output | Next State | Comment |
|---|---|---|---|---|
| 2 Power Up | One or more power-on cryptographic self-tests fail | STATUS_UN SUCCESSFUL | Init Error | (see comment for State 1 above) |
| 2 Power Up | System error | STATUS_UN SUCCESSFUL | Init Error | (see comment for State 1 above) |
| 3 Init Error | Automatic transition | No output | Power Down | The Init Error State is entered when FIPS.SYS's DriverEntry() fails as a result of either configuration errors (i.e. not enough memory, etc.) or errors resulting from the power up self-tests. |
| 4 Initialized | Key formatting operation (i.e. FipsDesKey(), Fips3Des3Key()) requested | No output | Key Initialized | The Initialized state is entered when FIPS.SYS's DriverEntry() returns successfully and the Windows Loader completes the loading of FIPS.SYS. |
| 5 Initialized | Key formatting operation failure | Operation specific error message | Operation Error | |
| 6 Operation Error | Automatic transition when keys have not yet been initialized | No output | Initialized | The Operation Error state is entered whenever an error occurs as a result of a cryptographic operation. FIPS.SYS will automatically transition back to either the Initialized or Key Initialized state depending on whether or not keys have been successfully formatted into a DESTable or DES3Table struct. |
| 7 Key Initialized | Generic cryptographic operation failure | Operation specific error message | Operation Error | The Key Initialized state is entered after keys are formatted into a DESTable or DES3Table struct with FipsDesKey(), Fips3Des3Key() |
| 8 Operation Error | Automatic transition when keys have already been initialized | No output | Key Initialized | (see comment for State 6 above) |
| 9 Key Initialized | Generic cryptographic operation (i.e. FipsDes(), Fips3Des(), or FipsCBC ()) completed | NO_ERROR | Initialized | (see comment for State 7 above) |
| 10 Initialized | Automatic transition when Windows XP Kernel calls the FIPS.SYS driver's unload function | NO_ERROR | Power Down | (see comment for States 4 and 5 above) |
| 11 Power Down | | | | The Power Down state is entered when OS calls the FIPS.SYS driver's unload function which was set in DriverUnload field of the DriverObject representing FIPS.SYS during the Power Up state. |

Data Decryption

FIG. 4 conceptually shows the user decryption process. A user's private key 84 (or a recovery agent's private key 90) is used to decrypt the corresponding encrypted FEK item stored in the data decryption field 74. To accomplish the decryption of the key, each encrypted FEK item in the DDF 74 (and, if necessary the DRF 82) and the user's or recovery agent's private key are iteratively fed into an extraction mechanism 86 (in the EFS service 50), until a match is found which properly decrypts the FEK 60. From there, the FEK 60 is fed into a file decryption mechanism 88 which uses an appropriately corresponding decryption algorithm in a known manner to decrypt the encrypted text 68 into plain text 64. Note that when multiple decryption algorithms are available, the data decryption field may store information about the encryption algorithm so that the file decryption mechanism 88 uses the correct decryption algorithm. Only one encryption algorithm can be used per file, although each of several files can have its own such algorithm.

Figure 6:
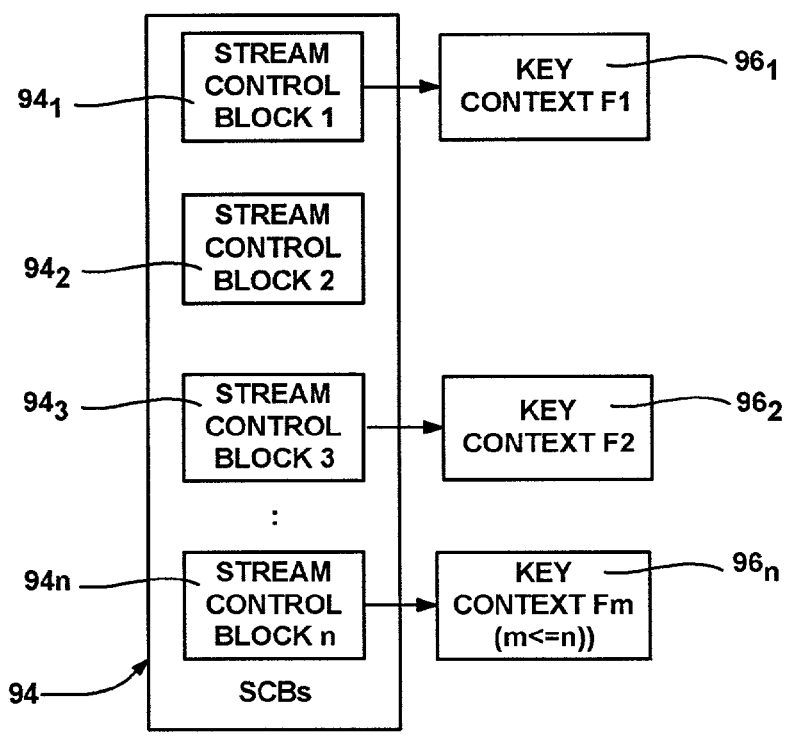
FIG. 6 is a representation of stream control blocks associated with files, at least some of which include key context information for file encryption and decryption.

While a file is open, the decrypted FEK 60 is saved by the file system 28 in association with the file 70. As shown in FIG. 6, with NTFS 28, stream control blocks 94 maintain file information for each open file, and each stream control block (e.g., $94_1$) corresponding to an encrypted file has a key context (e.g., $96_1$) pointed to thereby. The key context 96 maintains the information necessary to encrypt and decrypt a file during writes and reads to the disk, respectively. As described in more detail below, the FEK 60 is used to decrypt file data reads on a block-by-block basis, i.e., random access to a large file will decrypt only the specific blocks read from disk for that file. The entire file is not necessarily decrypted.

File Recovery

FIG. 5 conceptually illustrates the recovery process. The recovery process is similar to user decryption, except that the process uses a recovery agent's private key 90 to decrypt the FEK 60 in the DRF 82. Consequently, no match will be found in the DDF 74 and thus the search for a match will continue into the DRF 82. To initiate a recovery, the recovery agent submits his or her private key 90, and a data recovery field extraction mechanism 92 (which is preferably the same data decryption field extraction mechanism 86 of FIG. 4 described above) iteratively uses the agent's private key 90 to search the DDF 74. Then, since it is a recovery agent and not a user, no match is found in the DDF 74 and thus the extraction mechanism continues to search the DRF 82.

Regardless of whether it is a normal user opening or an opening for a recovery, once a key is found that is in the current context, (CryptoAPI 58 maintains a set of keys for each user), then the key is verified by comparing it to known information decrypted with that key. More particularly, at the time of encryption, the user's public key is appended to the FEK of the file, which is then encrypted with the FEK 60 as known information. If the found key decrypts the stored information to equal the known information, then the key is verified. This scheme provides a strong encryption technology as it provides one of many possible recovery agents with the ability to recover the file, thereby providing organizations with redundancy and flexibility in implementing recovery procedures.

EFS thus provides a built-in data recovery support, referred to as the "Recovery Policy". The preferred system enforces configuration of recovery keys, and is intentionally limited to only being usable when the system is configured with one or more recovery keys. The file recovery operation only divulges the randomly generated file encryption key 60, and not the user's or any other recovery agent's private key. As can be appreciated, this is ideal for most business environments where an organization may need to recover data that was encrypted by an employee after an employee leaves the organization or loses his or her key.

The recovery policy, also known as the EFS policy, may be defined at the domain controller of a Windows NT Domain, whereby the policy is enforced at all machines in that domain. The policy contains the public keys of the recovery agents. As a result, the recovery policy is only under the control of the domain administrators, thereby providing controls on who can recover the data. To enable the use of encryption features on a standalone Windows NT workstation in a home environment, as an added feature, EFS automatically generates recovery keys and saves them as machine keys, thereby reducing the administrative overhead for an average user.

In a domain, the recovery policy is sent to each of the machines on the domain, whereby even when not connected, the local machine maintains the policy therewith in a local security authority, LSA. In this manner, EFS can operate to encrypt files when not connected. Each time a machine joins the domain, or if the recovery policy changes, the policy is propagated to the machines in the domain when they are connected. Moreover, every time a file is opened, the metadata for that file is compared against the recovery policy to see if the recovery policy has changed, and if so, the metadata is updated with the FEK encrypted with the new user and/or recovery agent public key information. Safeguards, including hashes (MD5), are used to ensure that the recovery policy is not changed, such as by a malicious user.

For example, a malicious user may wish to make a file unrecoverable by changing the DRF 82. To detect this, using a section of the DRF 82, a cryptography hash (MD5) is created, signed with the FEK 60 of the file, and stored with the DRF 82. Later, when the file is opened and the FEK 60 is obtained, the section is decrypted with the FEK 60 to see if the information stored in the DRF 82 matches. If so, the stored recovery policy is proper, otherwise the recovery policy is replaced with the current recovery policy of the domain.

If a machine is not part of a domain, it still has a local recovery policy, but the recover keys are generated by and kept on the machine as describe above. In this manner, every file encrypted under EFS always has some recovery policy. If the machine later becomes part of a domain, the local recovery policy is wiped out and replaced with the domain policy.

General Operation

Figure 10:
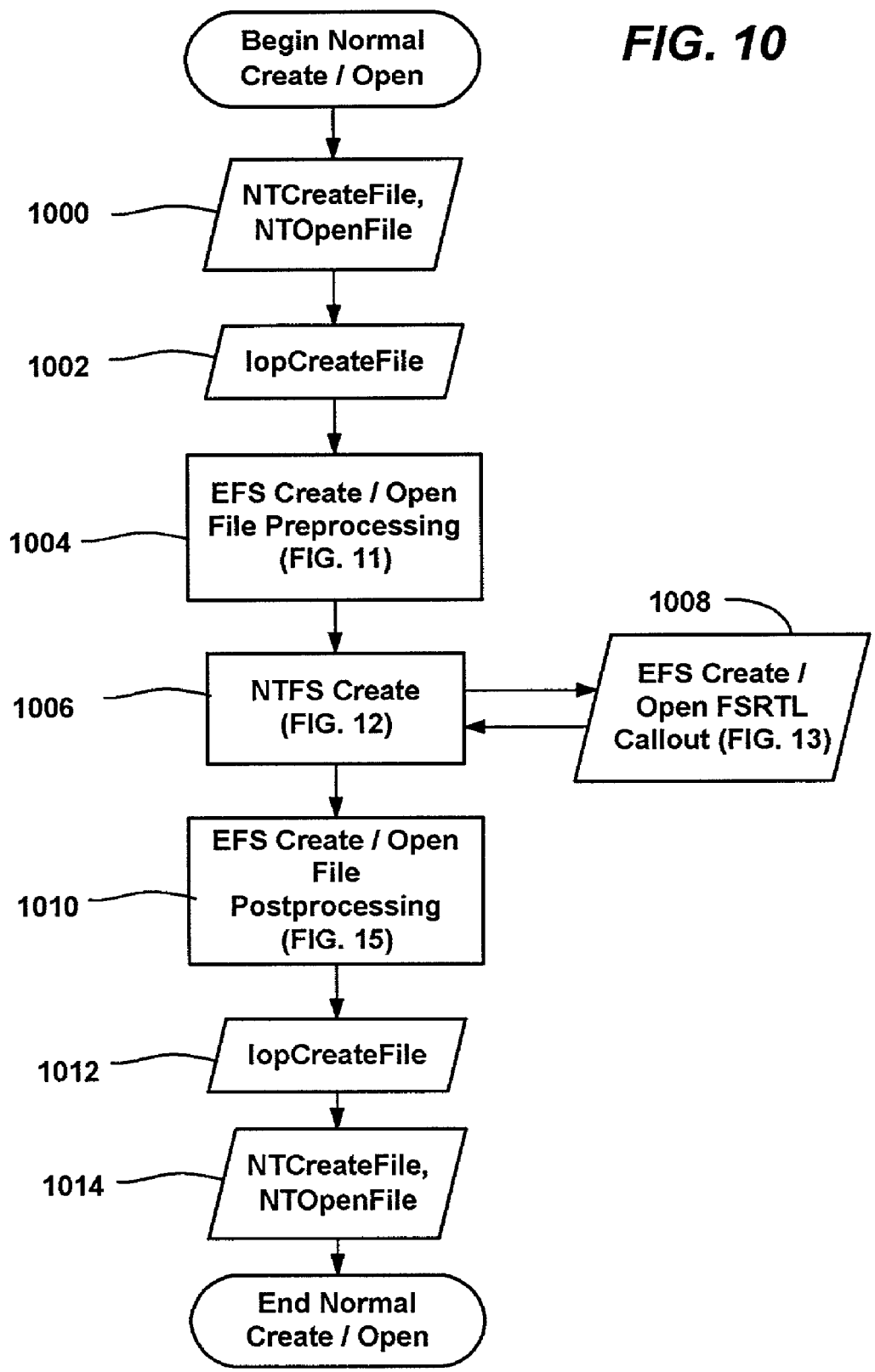
FIG. 10 is a flow diagram showing the overall flow of control to open or create a file in accordance with one aspect of the present invention.

Turning to an explanation of the operation of the invention and beginning with the flow diagram of FIG. 10, when a application 30 wishes to create or open an encrypted file, the application 30 first calls an appropriate API 32 requesting a new file be created in an encrypted directory, or an encrypted file be opened.

As shown in FIG. 10, once a create or open request is received, the I/O subsystem 56 arranges for passing the request as an IRP to the appropriate file system, e.g., NTFS 28, at steps 1000–1002. However, as described above, the IRP is first received by the EFS linked library 47 at step 1100 of FIG. 11, which recognizes the IRP as specifying an open/create operation.

Figure 7:
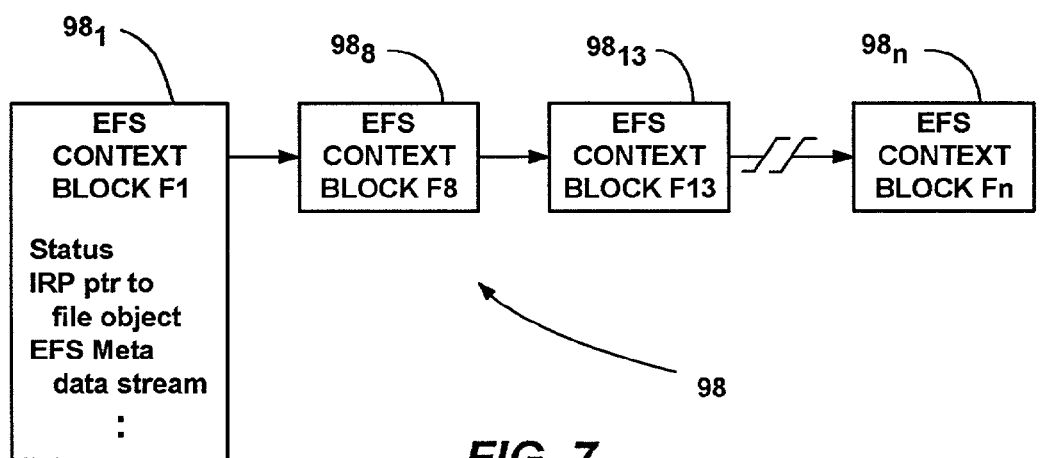
FIG. 7 is a representation of a context chain used for communicating information between encryption components for encrypted files and directories.
Figure 11:
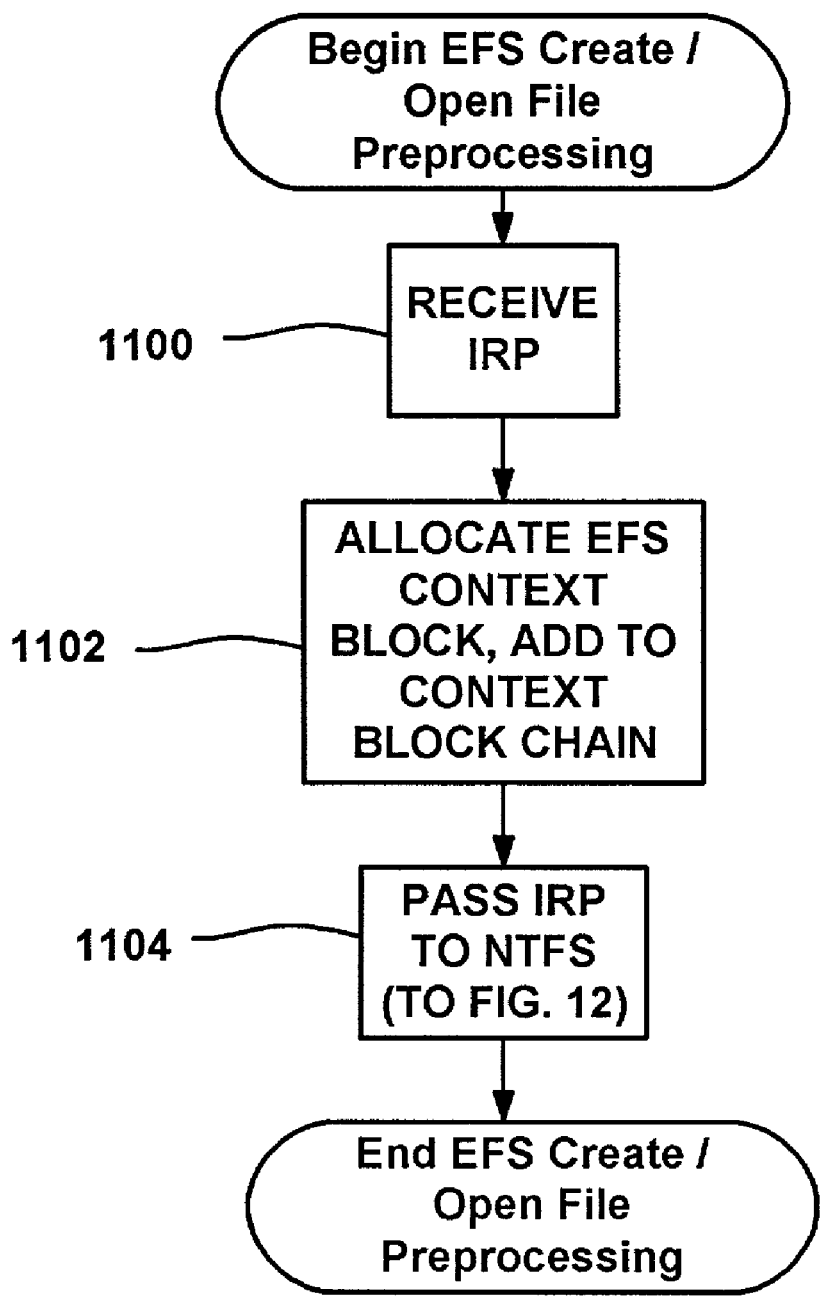
FIG. 11 is a flow diagram representing preprocessing steps generally taken as part of opening or creating a file.

The EFS linked library 47 begins the EFSCreateFile operation by performing some preprocessing as shown in FIG. 11. As represented by step 1102 of FIG. 11, the EFS linked library 47 allocates an EFS Context Block $98_1$ for this file, and adds it to the EFS context block chain 98 (FIG. 7). Note that the EFS context block $98_1$ is created for each new file, even though the file may not be encrypted, because the EFS linked library 47 does not know at this time whether the file is already encrypted or is to be encrypted. The EFS context block $98_1$ includes status information, which is initialized with "No processing needed," an IRP pointer pointing to the current file object, and an EFS metadata stream initialized to NULL. Lastly, at step 1104, the IRP is passed to NTFS 28.

Figure 12:
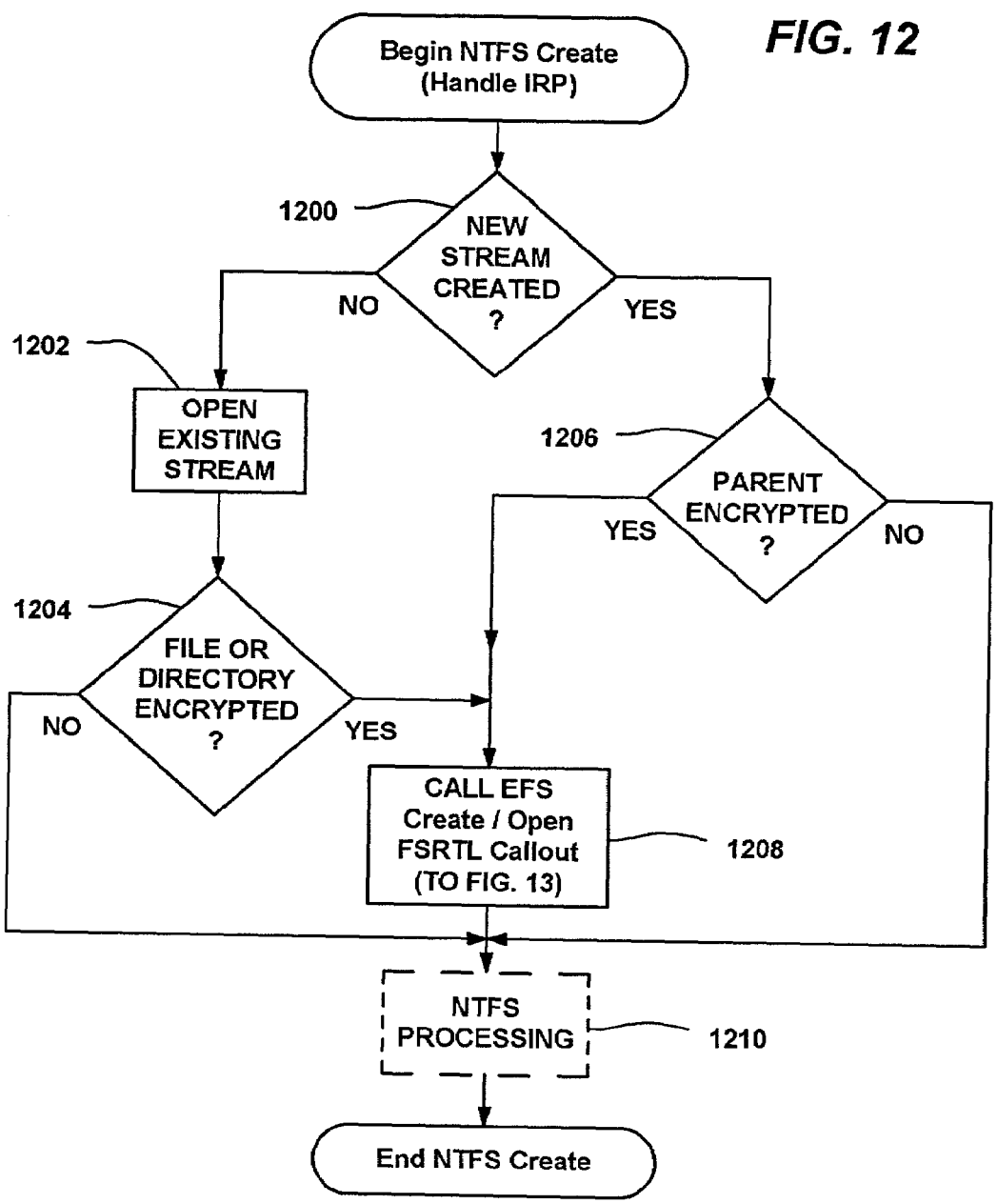
FIG. 12 is a flow diagram representing steps taken by the file system to handle a file open request.

As shown in step 1006 of FIG. 10, when NTFS 28 receives the IRP from the EFS linked library 47 and recognizes it as an NTFS 28 Create packet, NTFS 28 handles the create/open IRP. FIG. 12 generally shows how NTFS 28 handles the IRP. First, as represented by step 1200, information in the IRP is tested to determine if an existing stream is to be opened, or a new stream on file/directory is to be created. If an existing stream is to be opened, NTFS 28 opens the stream at step 1202. At step 1204, NTFS 28 determines if the file or its directory is encrypted, and if so, at step 1208 calls the FSRTL 48 open/create callout, described below with reference to FIG. 13.

Conversely, if a new stream was created as determined by step 1200, NTFS 28 next determines at step 1206 if the parent directory is encrypted. If the parent is encrypted, at step 1208, NTFS 28 calls the FSRTL 48 open/create callout, as described below. Note that if neither the parent is determined to be encrypted (step 1206) nor the file or directory encrypted (step 1204), NTFS 28 does not make the FSRTL 48 callout, whereby NTFS 28 simply performs any tasks it needs to at step 1210 before returning to the EFS linked library 47.

Figure 13:
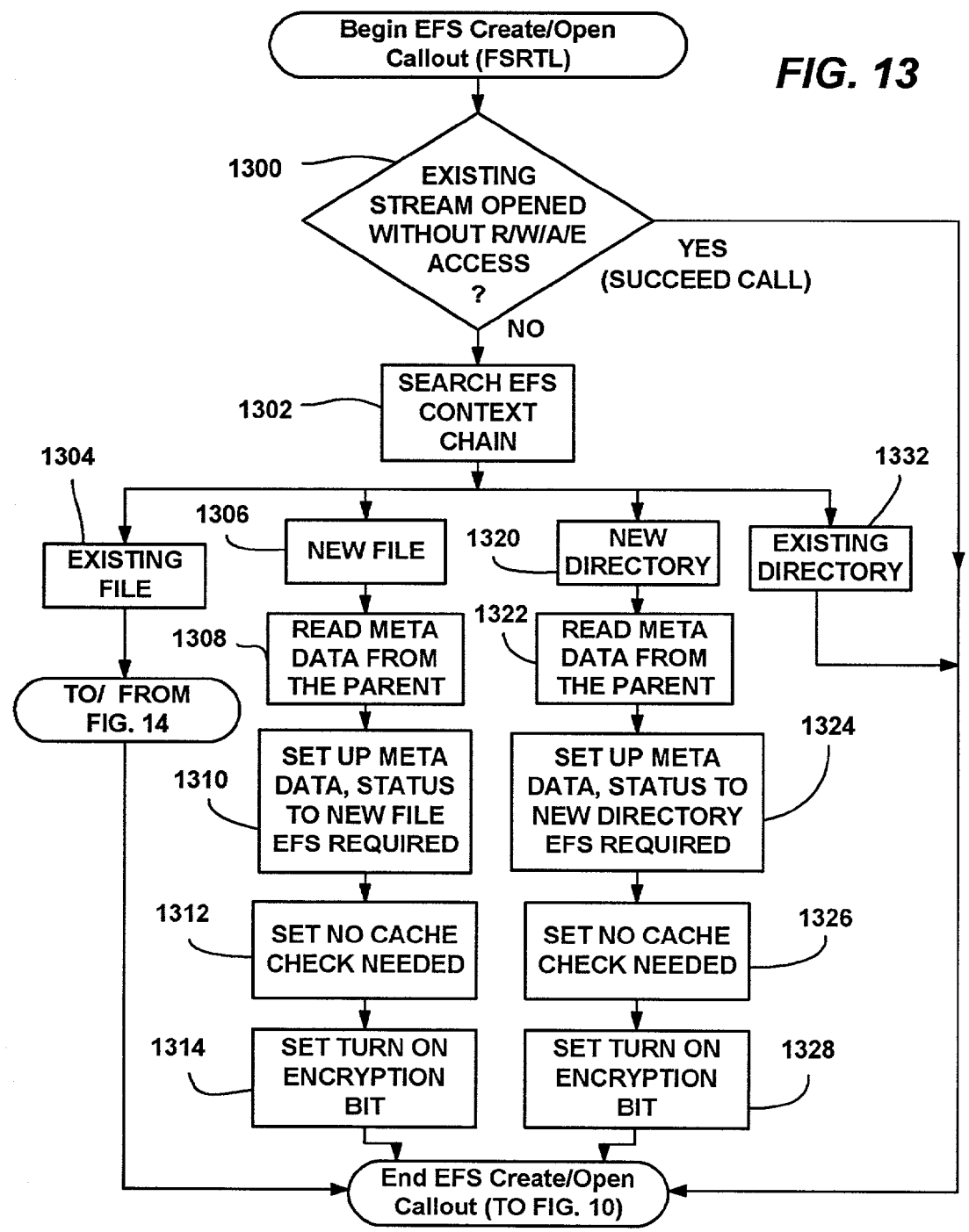
FIGS. 13–14 comprise a flow diagram representing the general steps taken by a callout to open or create an encrypted file in accordance with one aspect of the present invention.

The steps of the EFS create/open FSRTL 48 callout are generally represented in FIG. 13, wherein the FSRTL 48 callout begins by first examining the type of access requested by the user (step 1300). If an existing stream on the file or directory is opened without read, write, append or execute (R/W/A/E) access, the call is simply succeeded, as no encryption/decryption is needed, e.g., the user wants to read attributes, and attributes are not encrypted. Otherwise, at step 1302, the FSRTL 48 searches the EFS context chain 98 for the appropriate file object corresponding to this file (allocated at step 1102 of FIG. 11). The Create/Open callout performs operations based on the type of file/directory, as set forth below.

Figure 14:
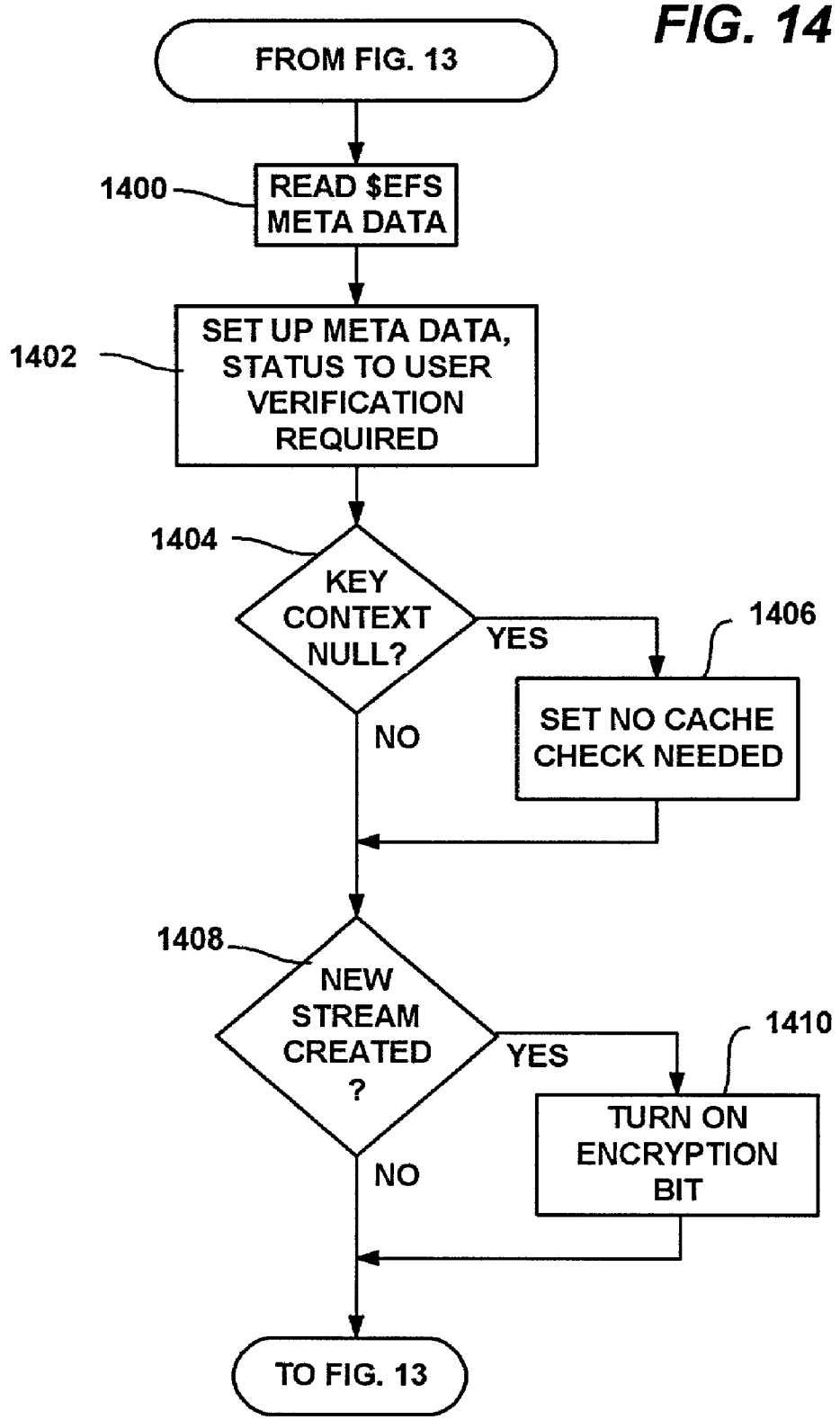

If the type of file is an existing file (step 1304), then FSRTL 48 was called because either a new stream was created or an existing stream was opened. If so, the user needs to be verified, and the callout process continues to step 1400 of FIG. 14. At step 1400, the EFS metadata from the file is read using an (NtOfs) API. Then, at step 1402, the metadata that was read is set up in the context block 98$_1$ and the status on the block changed to indicate "User Verification Required." Then the key context 96 is checked at step 1404, and if the NTFS key context 96 is NULL, then a key is needed. If the key context 96 is NULL (step 1404), this file was not read, and thus there is no possibility that decrypted file data is present in the cache memory. As a result, the context block is set to indicate "No Cache Check Needed" at step 1406. Lastly, if a new stream was created as determined by step 1408, the context block 98$_1$ is set to indicate "Turn On Encryption Bit" at step 1410.

If instead the type of file is a new file (step 1306 of FIG. 13), a new FEK and EFS metadata are needed. First, at step 1308, the EFS metadata is read from the parent directory using NtOfs API. Step 1310 sets up the metadata that was just read in the context block 98$_1$, and changes the status on the block to "New File Efs Required," "Turn On The Encryption Bit" (step 1312) and "No Cache Check Needed" (step 1314)."

If instead the file object type indicates a new directory (step 1320), only new EFS metadata is needed. There is no FEK in this case, because at present, streams in the directory are not encrypted. Accordingly, the EFS metadata from the parent directory is read at step 1322 (using NtOfs API). Then, at step 1324, the metadata that was just read is set up in the context block 98$_1$ and the status on the block changed to "New Directory Efs Required," "No Cache Check Needed" (step 1326) and "Turn On The Encryption Bit" (step 1328).

Lastly, if the type represents an existing directory (step 1332), either a new stream was created or an existing stream was opened. At present, no action is taken because the directory data streams are not encrypted. However, it can be readily appreciated that directory streams also may be encrypted in the same manner that file data streams are encrypted using the encrypting file system of the present invention.

As shown in FIG. 12, step 1210, the callout returns to NTFS 28, whereby NTFS 28 can perform any of its own operations. The file/create process returns to step 1010 (FIG. 10) the EFS filter EFS linked library 47 for post-processing.

The EFS Create/Open File post-processing process is represented in FIGS. 15–19. Beginning at step 1500 of FIG. 15, the context block 98$_1$ is evaluated for "No Cache Check Required" status. If a cache check is required, the process branches to step 1502 where the caller's security context along with the EFS ID for the file stored in the EFS stream are used by the EFS cache to check if this file was successfully opened by the user the recent past. If so, the call is succeeded since the cache already contains the appropriate information.

If not in the cache, step 1504 checks if read data, write data, append data or execute access is requested. If none of these are requested, but a new stream was created as determined by step 1506, and the context block 98$_1$ indicates "Turn On Encryption Bit" status (STEP 1508), the EFS data stream is not needed and is released. Only the encryption bit on the stream needs to be turned on, which is performed at step 1510. The post processing is complete and the overall process returns to step 1012 of FIG. 10.

Figure 15:
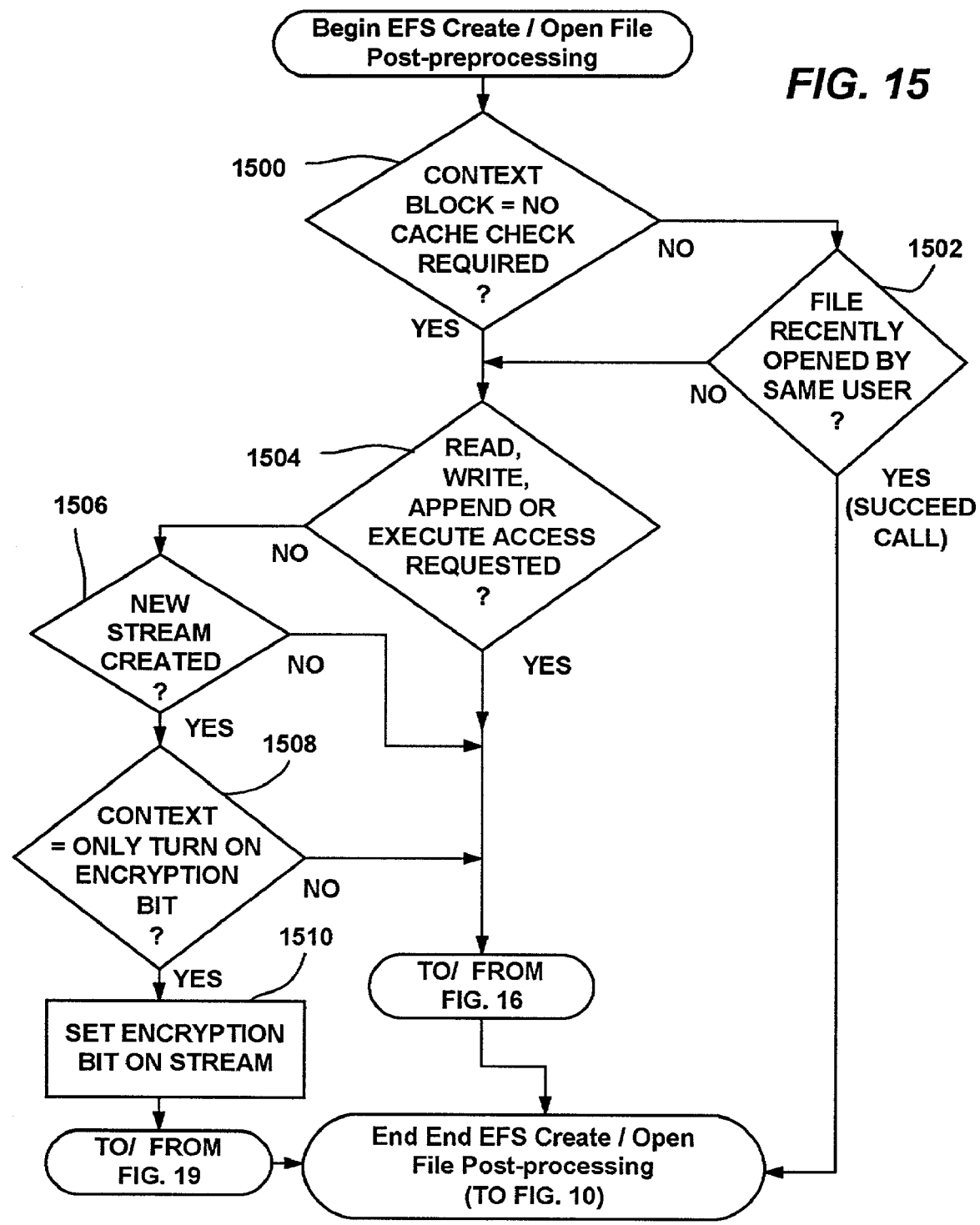
FIGS. 15–19 comprise a flow diagram representing post-processing steps generally taken as part of opening or creating a file.
Figure 16:
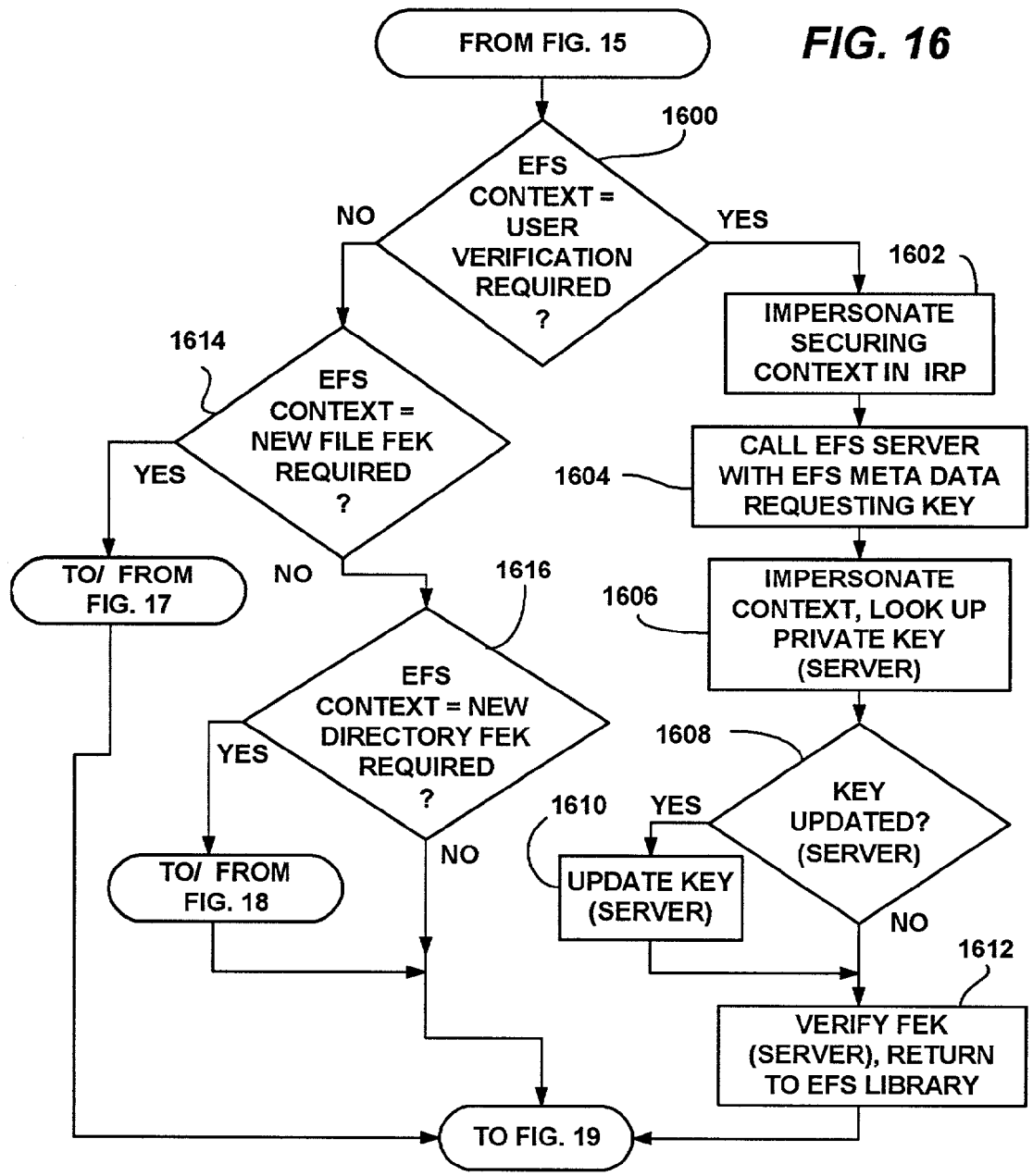

However, if none of the situations identified above with respect to FIG. 15 are satisfied, different operations need to be performed based on the status information, which is tested beginning at step 1600 of FIG. 16. First, if the status in the context block 90$_1$ indicates that user verification is required at step 1600, the EFS linked library 47 impersonates the security context (provided in the IRP) at step 1602, and at step 1604 calls the EFS service 50, passing the EFS metadata to request the FEK.

At step 1606, the EFS service 50 responds to the call by impersonating the context, and using information in the EFS metadata, looks up the user's private key to decrypt the FEK. The EFS service 50 may also update the EFS metadata (step 1610) if the user's key has been updated or any recovery keys are updated as determined by step 1608. In any event, at step 1612, the EFS service 50 verifies the integrity of the FEK 60 and returns all information back to the EFS linked library 47. More particularly, to verify integrity, a key integrity block is constructed as follows:

[F(FEK, Puk), FEK]Puk where
F( ) is a suitable hash function (preferably MD5),
Puk is the user's public key, and
[ ] Puk denotes encryption with the user's public key Consequently, when it is believed that a valid FEK has been decrypted with a user's public key, the block above is computed with the present information and compared to the block stored on the file. If they match, the key integrity is verified.

Figure 17:
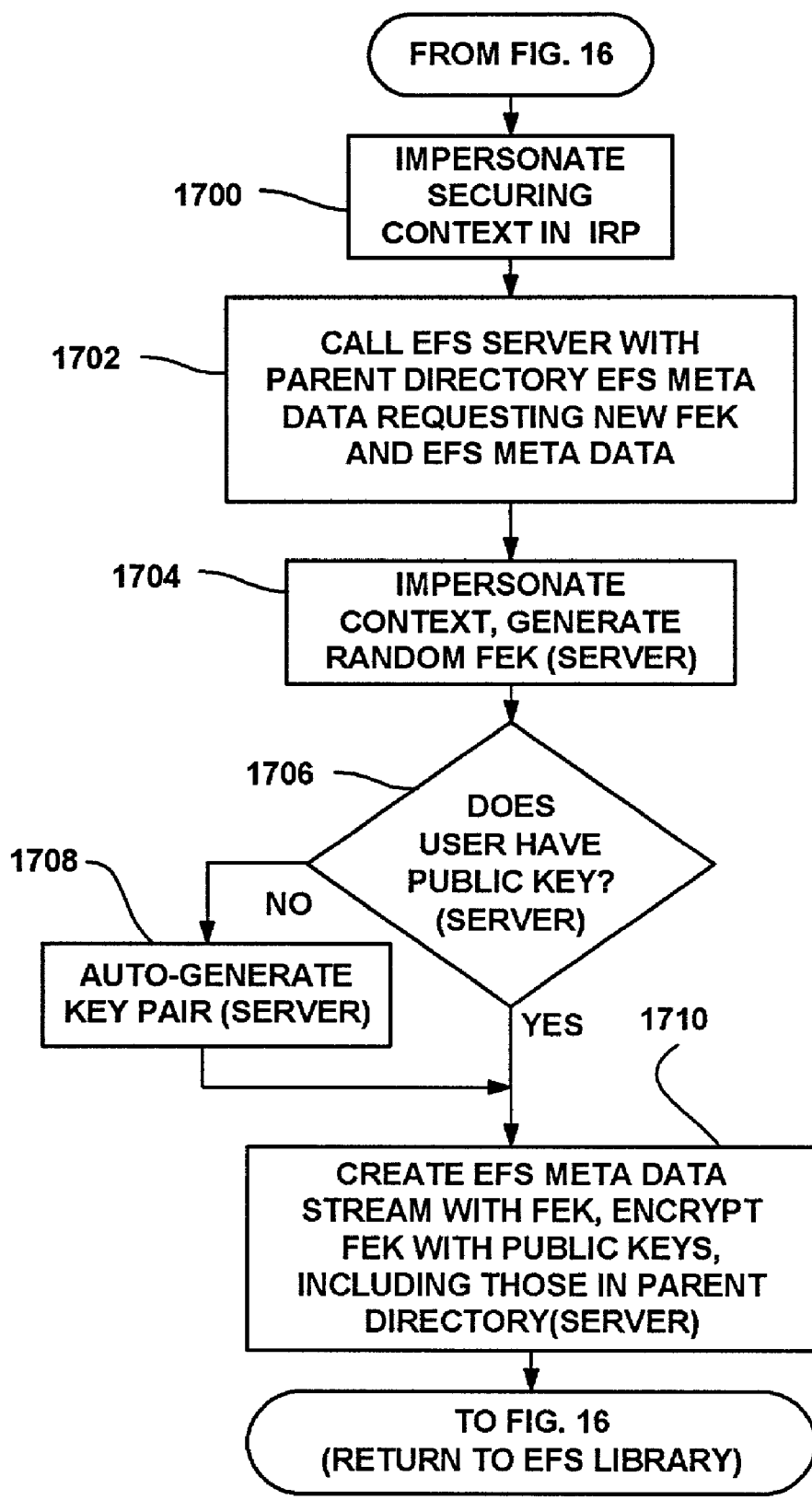
Figure 18:
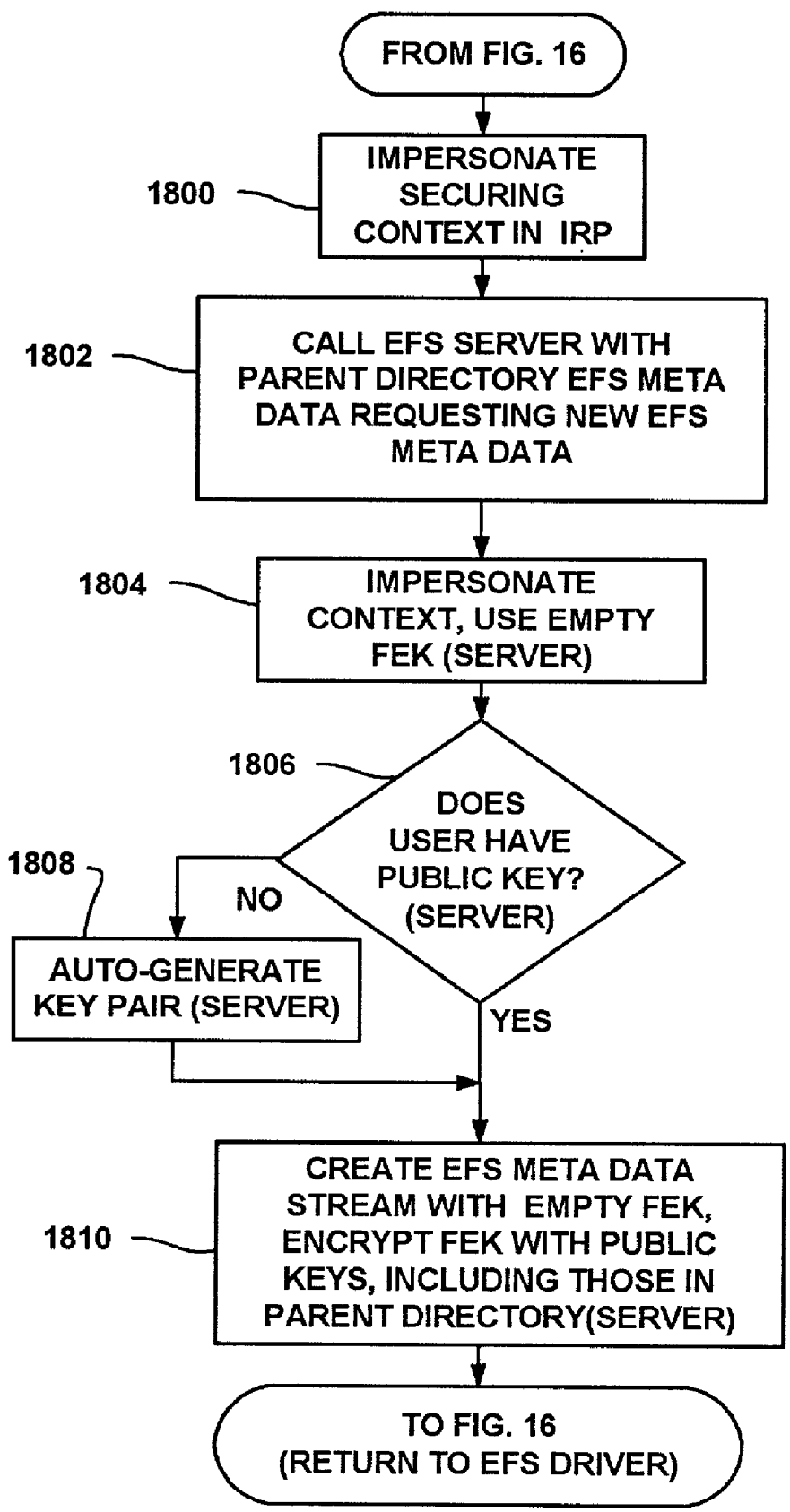

Alternatively, if the status did not indicate that user verification was required (step 1600), but instead indicated that a new file FEK was required, step 1614 branches to step 1700 of FIG. 17. At step 1700, the EFS linked library 47 impersonates the securing context in the IRP, and at step 1702 calls the EFS service 50 passing the parent directory's EFS metadata, requesting a new FEK and EFS metadata. At step 1704, the EFS service 50 impersonates the context and generates a random FEK 60. If the user does not have a key as determined by step 1706, at step 1708, the EFS service 50 auto-generates a key pair for the user. Lastly, step 1710 creates the EFS metadata stream with the FEK 60 encrypted under the user's public key and the recovery agent's public keys. The EFS service 50 also encrypts the FEK 60 using all the public keys in the parent directory's EFS metadata so that users who are allowed access to the parent directory also have access to the file (provided NTFS 28 access control lists allow such access).

If neither step 1600 nor 1614 was satisfied, the post-process branches to step 1616 to determine if the EFS context indicated that a new directory FEK is required. If so, the post-process branches to step 1800 of FIG. 18 wherein the EFS linked library 47 impersonates the securing context in the IRP. Step 1802 calls the EFS service 50, passing the parent directory's EFS metadata and requesting new EFs metadata. Note that no FEK is needed, as directory streams are not encrypted at this time. However, in the future, directory streams will also encrypted in the same manner that file streams are encrypted in accordance with the present invention.

In any event, at step 1804, the EFS service 50 impersonates the context, and, using an empty FEK, creates the EFS metadata stream. Step 1706 checks to see if the user does not have a key, and if not, at step 1708, the EFS service 50 auto-generates a key pair for the user. Then, at step 1810, the empty FEK is encrypted under the user's public key and the recovery agent's public keys, and the FEK is also encrypted using all the public keys in the parent directory's EFS metadata so that users allowed access to the parent directory also have access to the file if the access control lists allow such access.

Figure 19:
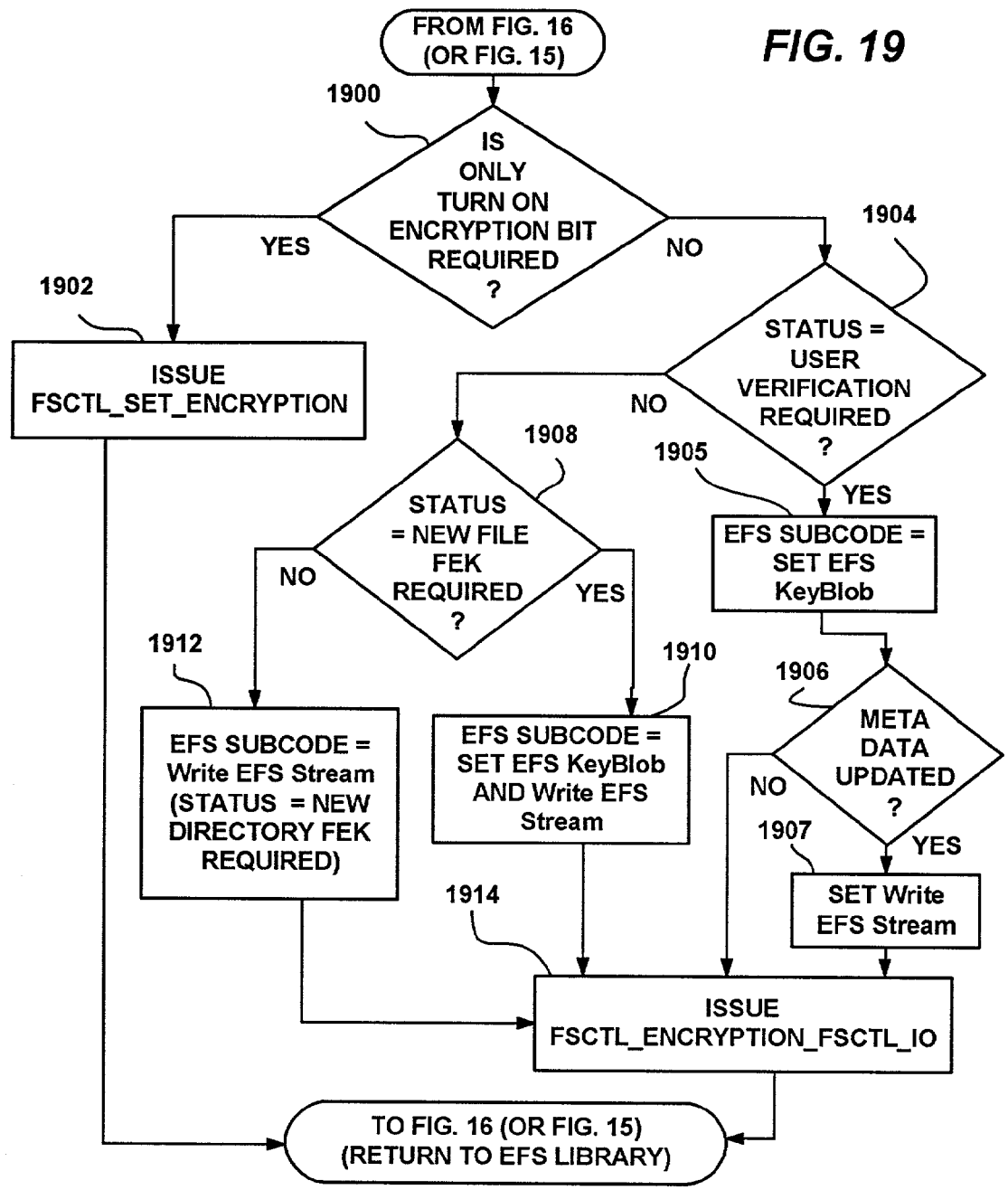

Ultimately, regardless of which of the three statuses were in the context, the post-process winds up at step 1900 of FIG. 19 to issue an appropriate FSCTL. Two such FSCTL calls are available, FSCTL_SET_ENCRYPTION and FSCTL_ENCRYPTION_FSCTL_IO. FSCTL_SET_ENCRYPTION tells NTFS 28 to turn on or turn off the encryption bit for a stream. The FSCTL_ENCRYPTION_FSCTL_IO is a miscellaneous FSCTL used for performing a number of operations, described below.

Figure 8:
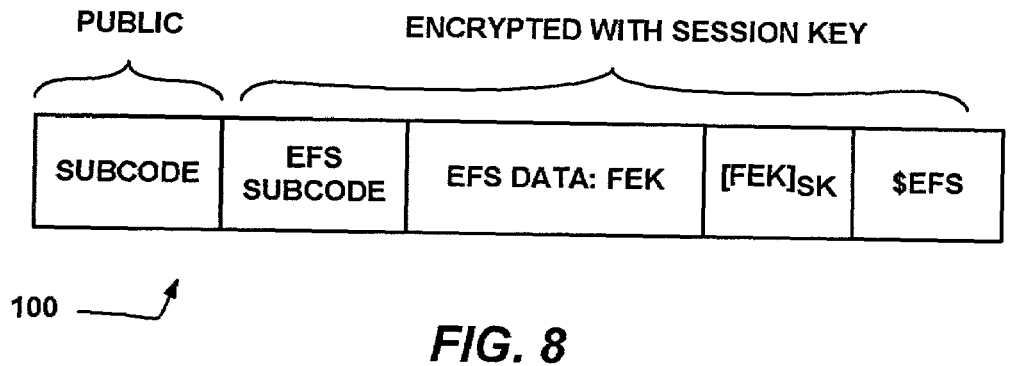
FIGS. 8 and 9 are representations of data structures used by certain components for communicating file information, including encryption key information, to one another.
Figure 9:
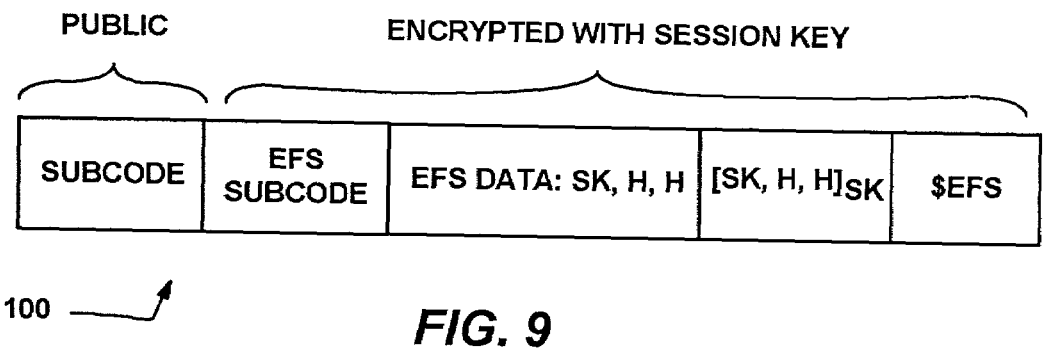

To this end, the FSCTLs are accompanied by a data structure 100, as shown in FIGS. 8 and 9. The data structure includes a public code so that NTFS 28 can differentiate between the two types of FSCTL calls, along with an EFS subcode to more particularly define the operation for the EFS linked library 47 and/or the EFS service 50. The data structure also includes EFS data specifying either FEK information (FIG. 8) or file handle information (FIG. 9), and, at times, EFS metadata. For purposes of security, the EFS subcode and EFS data fields are encrypted with the session key established when the EFS service 50 is initialized, as described above.

In use, the FSCTL_SET_ENCRYPTION may be issued, for example, to turn on the encryption bit for a file when that file is first put into an encrypted directory. The subcode indicates whether the encryption bit should be turned on or off. For such an operation, the FEK 60 is already known, and thus as shown in FIG. 8, the EFS data includes the FEK, and the FEK encrypted with the session key. Note that all but the public code is encrypted with the session code. To verify the integrity and the source of the data structure 100, the encrypted portion of the data structure is decrypted. Then, the encrypted FEK is decrypted and compared with the other FEK, and if equal, the structure is verified. The EFS stream, if available may also be compared with the EFS metadata, if otherwise known. Since the FEK is not always known, a similar verification is performed using the session key and the file handle as shown in FIG. 9. A repeated file handle is actually used in the appropriate fields (FIG. 9) so as to equal a length of eight bytes.

The callouts to the FSRTL 48 (via FileSystemControl_1 or FileSystemControl_2, and passed through NTFS 28) are used to overwrite attributes or set attributes depending on an accompanying subcode. Two bits of the subcode represent the overwrite attributes or set attributes operations. Note that when the EFS stream is to be written for a new file, FILE_SYSTEM_CONTROL_1 is used with the FSRTL 48 callout to also turn on the encryption bit (as performed by NTFS 28, described above). Alternatively, FILE_SYSTEM_CONTROL_2 is used with the callout when no change to the encryption bit is needed, for example, if the user has simply changed user keys.

Regardless which is used, one bit of the subcode represents the operation "Set EFS KeyBlob," which indicates to the FSRTL 48 that new encryption key information is available and needs to be entered into the appropriate key context. Another bit represents the operation "Write EFS Stream." Write EFS Stream is issued by the EFS service 50, such as when the user or recovery agent has changed a public key and the file metadata needs to be rewritten with the EFS metadata in the data structure 100. One other subcode represents "Get EFS stream," which results in the current EFS attributes for a file being written into the EFS field, such as when a user wants to export a stream or wants to know a key name.

Thus, returning to FIG. 19, step 1900 tests if the only requirement is to turn on the encryption bit, and if so, issues the FSCTL_SET_ENCRYPTION control at step 1902 with the subcode indicating that the bit should be turned on. Of course, the other EFS data including the session key, handle, handle and encrypted copy of same is also in the data structure 100 for verification purposes. In any event, the FSCTL reaches NTFS 28, which turns around and sets the encryption bit on the stream (and on the file if not already on) and calls an FSRTL callout to pass the information to the FSRTL 48.

If step 1900 is not satisfied, the ENCRYPTION_FSCTL_IO FSCTL needs to be called with an appropriate subcode in the data structure 100. Thus, if the status is "User Verification Required" (step 1904), the subcode is set to KeyBlob at step 1905. Next, if the metadata has been updated as determined by step 1906, step 1907 sets the Write EFS Stream subcode bit before the call at step 1914. Otherwise, if the status is "New File FEK Required" (step 1908), the subcode is set to KeyBlob and Write EFS Stream at step 1910, i.e., both bits are set. If neither of these, then the status is "New Directory FEK Required," and the subcode is set to Write EFS Stream at step 1912, i.e., only the other bit is set. The FSCTL is issued at step 1914.

Read and Write

Figure 20:
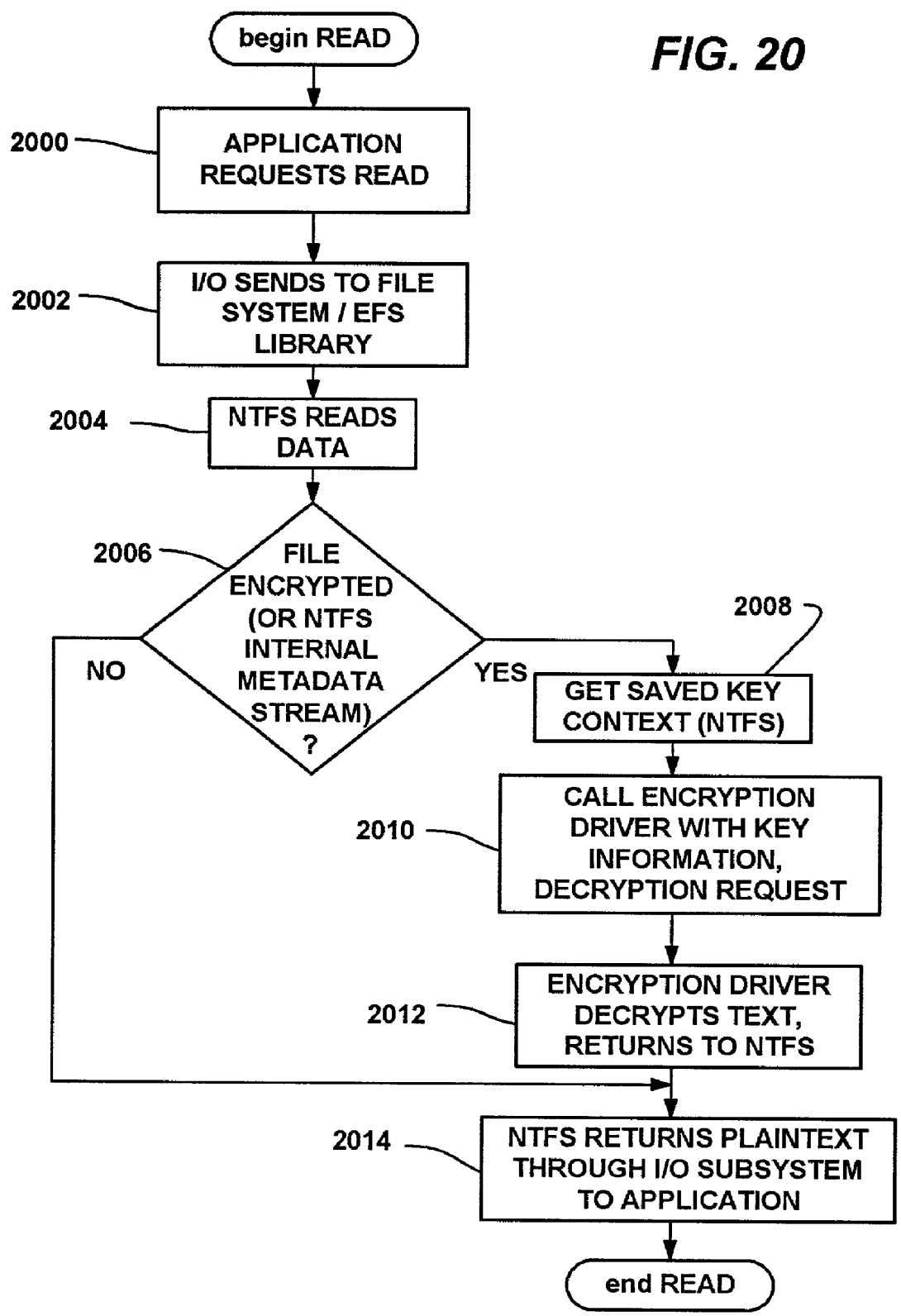
FIG. 20 is a flow diagram representing steps taken by the various components to handle a file read request.

Turning to an explanation of the read and write operations of the present invention, as first shown in FIG. 20, when an application 30 requests to read some data from the open file (step 2000), the I/O subsystem 56 receives the read request and passes it as an IRP to the appropriate file system 28, e.g., NTFS. First, however, the IRP is received by the EFS linked library 47, which recognizes the IRP as corresponding to a read request, and as a result, directly hands the IRP to NTFS 28 at step 2002. At step 2004, NTFS 28 reads the encrypted data from disk into a buffer just as it would read the plaintext data for any other file. However, for the encrypted file, the file system 28 recognizes at step 2006 that this file is encrypted, and at step 2008 remembers and gets the key context $96_1$ that the encryption EFS linked library 47 earlier had returned from the create/open callback. At step 2010, NTFS 28 uses the AfterReadProcess callback and provides the registered function with the data and enough information, including the encryption context, to decrypt the data. In general, the information includes the offset into the file, a pointer to the read buffer, the length to read, and they key. At step 2012, the encryption EFS linked library 47 decrypts the data and returns it to the file system 28, whereby at step 2014 the file system 28 then returns this plaintext through the I/O subsystem 56 to the application in the normal way. Note that however that certain NTFS 28 internal metadata streams containing file indexing and other such information are not encrypted. NTFS 28 recognizes these streams at step 2006, and temporarily skips over steps 2008–2012 for these particular streams.

Figure 21:
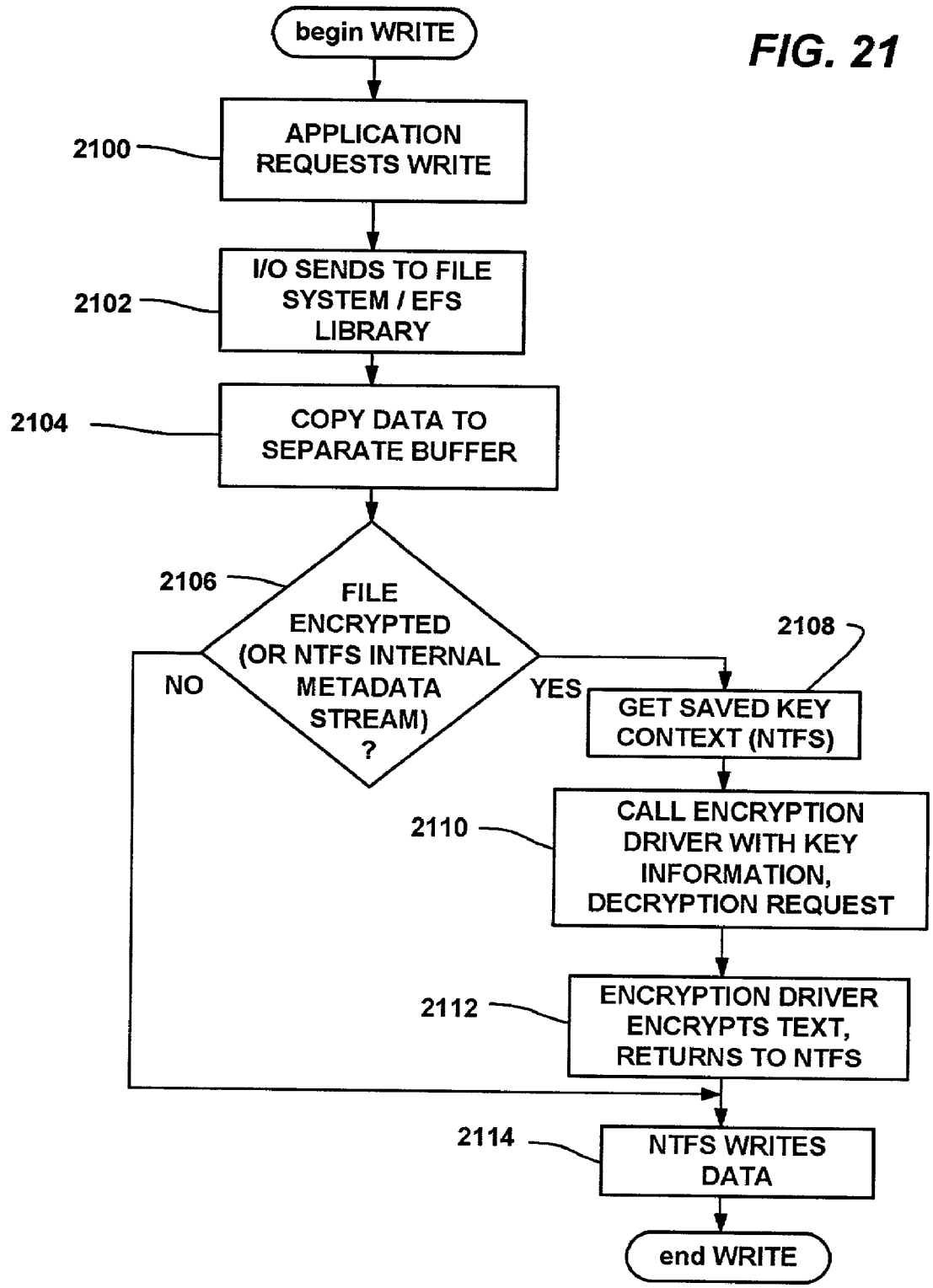
FIG. 21 is a flow diagram representing steps taken by the various components to handle a file write request.

As shown in FIG. 21, when an application 30 requests to write data to the open file (step 2100), the I/O subsystem 56 receives the write request and passes it as an IRP to the appropriate file system 28, e.g., NTFS. First, however, the IRP is received by the EFS linked library 47, which recognizes the IRP as corresponding to a write request, and as a result, directly hands the IRP to NTFS 28 at step 2102. At step 2104, NTFS 28 copies the write data into a separate buffer so that no changes can be made to the data that is to be written. For the encrypted file, the file system 28 recognizes at step 2106 that this file is encrypted, and at step 2108 remembers and gets the key context $96_1$ that the encryption EFS linked library 47 earlier had returned from the create/open callback. At step 2110, NTFS 28 uses the BeforeWriteProcess callback and provides the function with the data and enough information, including the encryption context, to encrypt the data. At step 2112, the encryption EFS linked library 47 encrypts the data and returns it to NTFS 28, whereby at step 2114 the file system 28 then writes the now-encrypted data in the separate buffer to the non-volatile storage 40 in the normal way, i.e., as if it was plaintext data for any other file. Again note that the NTFS 28 internal metadata streams containing the file indexing and other such information are not to be encrypted. NTFS 28 recognizes these streams at step 2106, and temporarily skips over steps 2108–2112 for these particular streams.

Encrypt and Decrypt File APIs

EFS also provides APIS 32 to facilitate encryption and decryption of stored files. The Win32 EncryptFile API is used to encrypt a plaintext file/directory. AS shown in FIG. 22, with this API, the application 30 (user) provides the name of the file to encrypt at step 2200, and this call translates into a call to the EFS service 50 to do the operation. At step 2202, the EFS service 50 opens the file on the user's behalf, makes a backup copy for crash recovery purposes and at step 2204 marks it for encryption by issuing the SET_ENCRYPT file control (FSCTL). At step 2206, the EFS service 50 then reads data from each stream in the copy and writes the data back to the original file at step 2208. Note that during the write operation, because the encryption bit is set, the data is automatically encrypted before being written to the disk. The process is repeated via step 2210 until all data streams are written. If this call completes successfully (step 2212), the backup is deleted at step 2214, otherwise the original file is restored at step 2216 and the call is failed. In the case of a directory, the directory is simply marked encrypted, as there is no data to encrypt. Note that, as described above, NTFS 28 internal metadata streams are not encrypted.

A WIN32 DecryptFile API is also provided by the EFS service 50, and is the converse operation of the encrypt file/directory operation. As shown in FIG. 23, at steps 2300–2302, the EFS service 50 is provided with the file name and opens the file on the user's behalf. Steps 2306–2310 read the data from all streams and write those streams into a copy, which is plaintext, as decryption happens transparently. At step 2312, the service then issues the decrypt file control to delete the metadata and remove the encryption attribute. Then, as shown by steps 2314–2318, the API writes back all the data streams from the copy over the original, which are written in plaintext. If this completes successfully, the copy is deleted at step 2322, otherwise the original is restored at step 2324. In the case of a directory, the directory is simply marked as decrypted to delete the metadata and the attribute, as there is no data to decrypt.

As can be appreciated, EFS file encryption is supported on a per file or entire directory basis (although NTFS 28 operates per stream). Directory encryption is transparently enforced, i.e., all files (or subdirectories) created in a directory marked for encryption are automatically created encrypted. Moreover, file encryption keys are per file, making them safe against move/copy operations on the file system volume. Unlike existing application-level schemes, the file need not be decrypted before use, since, as will become apparent below, the encryption and decryption operations will be done transparently and on the fly when bytes travel to and from the disk. EFS will automatically detect the encrypted file and locate the user's key from a key store. The mechanisms of key storage are leveraged from CryptoAPI, and as a result the users will have the flexibility of storing keys on secure devices such as smart cards and/or floppy disks.

Moreover, in keeping with the invention, EFS cooperates with the underlying file system 28 (e.g., NTFS), whereby EFS facilitates the writing (by a properly developed application program) of encrypted temporary files. With such an application program, when temporary files are created, the attributes from the original file are copied to the temporary file making the temporary copy also encrypted. In addition, the EFS linked library 47 is a Windows NT kernel mode driver, which uses the non-paged pool to store file encryption key, thereby ensuring that the key never makes it to the page file.

The EFS architecture allows file sharing between any number of people by simple use of the public keys of those people. Each user can then independently decrypt the file using their private keys. Users can be easily added (if they have a configured public key pair) or removed from the clique of sharers.

In a stand-alone configuration, EFS allows users to start encrypting/decrypting files with no administrative effort to set up a key, i.e., EFS supports auto-generation of a key for the user if one is not configured. With a domain configuration, an administrator only needs to set up a domain policy once for EFS to become operational. Lastly, EFS will also support encryption/decryption on remote files stored on file servers. However, the data once read from the disk is decrypted on the fly and hence may travel in plaintext on the wire if the file sharing protocol does not implement communication encryption, i.e., EFS addresses storage encryption, not communication encryption. Communication protocols can be used to provide such encryption.

As can be seen from the foregoing detailed description, there is provided a system and method for encrypting data, the system and method integrated into a file system such that encryption and decryption work transparently to legitimate users. The system and method provide for the ability to share sensitive data among more than one legitimate user, and adding and removing access for a user is simple. A strong cryptographic solution is provided that addresses encrypted data recovery, such as when users lose keys. The system and method are flexible and extensible.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. In a computing device, a system comprising:
    an interchangeable cryptographic module including at least one algorithm for converting unencrypted data into encrypted data and converting encrypted data into unencrypted data; and
    file system level software that maintains files on a non-volatile storage including reading and writing file data to the files on the non-volatile storage, the file system level software configured to:
    1) identify a file maintained on the non-volatile storage as an encrypted file;
    2) receive a request to write presently unencrypted file data to the encrypted file, and in response:
        a) to communicate with the interchangeable cryptographic module including providing key data to convert the unencrypted file data into encrypted file data, and
        b) to write the encrypted file data to the encrypted file on the non-volatile storage; and
    3) receive a request to read file data from the encrypted file, and in response:
        a) to read the encrypted file on the non-volatile storage to obtain encrypted data corresponding to the request,
        b) to communicate with the interchangeable cryptographic module including providing key data to convert the encrypted data into unencrypted data, and
        c) to return the unencrypted data.

2. The system of claim 1 wherein the interchangeable cryptographic module includes a plurality of algorithms, and wherein the file system level software specifies a selected algorithm to use.

3. The system of claim 2 wherein the file system level software specifies which algorithm to use by calling a selected function of the interchangeable cryptographic module that corresponds to the selected algorithm.

4. The system of claim 3 wherein the file system level software indicates whether encryption or decryption is desired by passing data to the interchangeable cryptographic module when calling the selected function thereof.

5. The system of claim 1 wherein the interchangeable cryptographic module registers functions with the file system level software.

6. The system of claim 1 wherein the interchangeable cryptographic module and the file system level software comprise kernel mode components.

7. A computer-implemented method, comprising:
    operably connecting an interchangeable cryptographic module to file system level software, the interchangeable cryptographic module including a plurality of selectable algorithms for converting unencrypted data into encrypted data and converting encrypted data into unencrypted data;
    the file system level software;
    1) receiving a request to read file data from an encrypted file;
    2) obtaining key data that corresponds to a key to use and algorithm data corresponding to a selected algorithm of the plurality to use for data decryption;
    3) reading encrypted file data corresponding to the requested data from the encrypted file; and
    4) returning unencrypted file data corresponding to the request by communicating with the interchangeable cryptographic module to invoke the selected algorithm and decrypt the encrypted file data into the unencrypted file data via the key.

8. The method of claim 7 wherein the file system level software obtains the algorithm data corresponding to a selected algorithm from information on the non-volatile storage associated with the encrypted file.

9. The method of claim 7 wherein the file system level software invokes the selected algorithm of the cryptographic module by calling a function corresponding to the algorithm with input buffer, output buffer, and key-related data.

10. A computer-readable medium having computer-executable instructions for performing the method of claim 7.

11. In a computer system, a method comprising:
    receiving information at file system level software indicating that a file has encrypted file data stored in a non-volatile storage;
    obtaining a key for decrypting the file data from key information maintained in association with the file on the same non-volatile storage as the encrypted file data; and
    receiving a request to read encrypted file data of the encrypted file from the non-volatile storage, and in response, reading the encrypted file data from the non-volatile storage, decrypting the encrypted file data into decrypted file data at the file system level software using the key, and returning the decrypted file data.

12. The method of claim 11 wherein the request is received from an application that is unaware that the file data is encrypted.

13. The method of claim 11 further comprising receiving a request to write presently unencrypted file data to the encrypted file on the non-volatile storage, and in response, encrypting the presently unencrypted file data into encrypted file data at the file system level software with an encryption key corresponding to the key for decrypting the file data, and writing the encrypted file data to the non-volatile storage.

14. The method of claim 11 wherein the file system level software includes a file system component and an encryption/decryption software component linked thereto that decrypts the encrypted file data into decrypted file data.

15. The method of claim 11 further comprising, registering functions of the encryption/decryption software component with the file system component.

16. The method of claim 11 wherein the file system level software includes a file system component and an algorithm component separate therefrom that provides at least one algorithm for performing encryption and decryption operations.

17. The method of claim 11 wherein the file system level software includes a file system component and an encryption/decryption software component linked thereto that decrypts the encrypted file data into decrypted file data using an algorithm component separate therefrom that provides at least one encryption/decryption algorithm.

18. A computer-readable medium having computer-executable instructions for performing the method of claim 11.

19. A computer-implemented method, comprising:
operably connecting an interchangeable cryptographic module to file system level software, the interchangeable cryptographic module including a plurality of selectable algorithms for converting unencrypted data into encrypted data and converting encrypted data into unencrypted data;
the file system level software:
1) receiving a request to write presently unencrypted file data to an encrypted file;
2) obtaining key data that corresponds to a key to use and algorithm data corresponding to a selected algorithm of the plurality to use for data encryption;
3) communicating with the interchangeable cryptographic module to invoke the selected algorithm and encrypt the unencrypted file data into the encrypted file data via the key; and
4) writing the encrypted file data corresponding to the request to the encrypted file on the non-volatile storage.

20. The method of claim 19 wherein the file system level software further writes information identifying the selected algorithm to the non-volatile storage in association with the encrypted file.

21. The method of claim 20 wherein the file system writes information identifying the selected algorithm to the non-volatile storage in association with the encrypted file by writing data into part of the encrypted file such that the selected encryption algorithm can be later determined by reading that part of the file.

22. The method of claim 19 wherein the file system level software invokes the selected algorithm of the cryptographic module by calling a function of the cryptographic module that corresponds to the selected algorithm.

23. In a computer system having a file system, a method of returning requested file data, comprising:
receiving at file system software a request to read file data of an encrypted file;
determining whether file data corresponding to the request is stored on a storage medium or has been decrypted to an access-controlled location; and
if the file data has been decrypted to the access-controlled location, returning the file data in decrypted form from the access-controlled location in response to the request; or
if the file data is stored on the storage medium, reading the file data corresponding to the request from the storage medium, calling an interchangeable cryptographic module to decrypt the file data into unencrypted file data, and returning the unencrypted file data in response to the request.

24. The method of claim 23 wherein calling an interchangeable cryptographic module comprises calling a function thereof based on an algorithm used to encrypt the data.

* * * * *

UNITED STATES PATENT AND TRADEMARK OFFICE
CERTIFICATE OF CORRECTION

PATENT NO. : 6,986,043 B2  Page 1 of 1
APPLICATION NO. : 09/870411
DATED : January 10, 2006
INVENTOR(S) : Andrew et al.

It is certified that error appears in the above-identified patent and that said Letters Patent is hereby corrected as shown below:

Title Page;

On the face page, in field (63), in column 1, line 2, after "now Pat. No." delete "6,249,886" and insert -- 6,249,866 --, therefor.

On the face page, in field (56), under "U.S. Patent Documents", in column 1, line 2, after "5,224,166 A 6/1993" delete "Hartman" and insert -- Hartmann --, therefor.

On page 2, in field (56), under "Other Publications", in column 1, line 5, after "K" delete "," and insert -- . --, therefor.

On page 2, in field (56), under "Other Publications", in column 2, line 11, after "USENIX 27-35" delete "," and insert -- . --, therefor.

On page 2, in field (56), under "Other Publications", in column 2, line 16, after "Editors" delete "," and insert -- : --, therefor.

In column 1, line 8, after "now U.S. Pat. No." delete "6,249,886" and insert -- 6,249,866 --, therefor.

In column 5, line 41, after "supplied" delete ")".

In column 24, line 8, in Claim 7, after "software" delete ";" and insert -- : --, therefor.

Signed and Sealed this

Twenty-fifth Day of August, 2009

David J. Kappos
*Director of the United States Patent and Trademark Office*